(12) United States Patent
Tucker et al.

(10) Patent No.: US 10,713,620 B2
(45) Date of Patent: Jul. 14, 2020

(54) SYSTEM AND METHOD FOR SUPPLY CHAIN MANAGEMENT

(71) Applicant: Walmart Apollo, LLC., Bentonville, AR (US)

(72) Inventors: Jacob Tucker, Bella Vista, AR (US); Satya Thapa, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 414 days.

(21) Appl. No.: 15/418,346

(22) Filed: Jan. 27, 2017

(65) Prior Publication Data

US 2017/0140337 A1    May 18, 2017

Related U.S. Application Data

(63) Continuation-in-part of application No. PCT/US2015/042581, filed on Jul. 29, 2015.
(Continued)

(51) Int. Cl.
*G06Q 10/08* (2012.01)
*G06Q 30/02* (2012.01)

(52) U.S. Cl.
CPC ....... *G06Q 10/0875* (2013.01); *G06Q 10/087* (2013.01); *G06Q 30/0207* (2013.01)

(58) Field of Classification Search
CPC ............. G06Q 10/0875; G06Q 10/087; G06Q 30/0207
(Continued)

(56) References Cited

U.S. PATENT DOCUMENTS

| 7,198,192 B2 | 4/2007 | Page |
| 7,356,495 B2 * | 4/2008 | Beigl ............. G06K 7/10336 705/28 |

(Continued)

FOREIGN PATENT DOCUMENTS

| WO | 2013038421 | 3/2013 |
| WO | 2016018979 | 2/2016 |

OTHER PUBLICATIONS

PCT; App. No. PCT/US2015/042581; International Preliminary Report on Patentability dated Oct. 9, 2015.
(Continued)

*Primary Examiner* — Florian M Zeender
*Assistant Examiner* — Christopher R Buchanan
(74) *Attorney, Agent, or Firm* — Fitch, Even, Tabin & Flannery LLP

(57) ABSTRACT

According to one aspect, embodiments of the invention provide a device for supply chain management, the device comprising a scanner configured to record an identification code associated with a sample product, a supply chain management module coupled to the scanner, and a network interface coupled to the supply chain management module, wherein the supply chain management module is configured to retrieve the identification code from the scanner, transmit the identification code to a supply chain management server via the network interface, receive product offer information related to the sample product from the supply chain management server via the network interface, and transmit a product offer status update related to the sample product to the supply chain management server via the network interface.

18 Claims, 28 Drawing Sheets

Related U.S. Application Data

(60) Provisional application No. 62/030,711, filed on Jul. 30, 2014.

(58) Field of Classification Search
USPC .................................... 705/29, 26.4, 14.1
See application file for complete search history.

(56) References Cited

U.S. PATENT DOCUMENTS

| | | | |
|---|---|---|---|
| 7,387,250 | B2 | 6/2008 | Muni |
| 2002/0013721 | A1 | 1/2002 | Dabbiere |
| 2005/0149391 | A1* | 7/2005 | O'Shea ................ G06Q 10/087 705/14.38 |
| 2007/0162337 | A1* | 7/2007 | Hawkins ................ G06Q 30/02 705/14.27 |
| 2010/0017296 | A1* | 1/2010 | Spignesi, Jr. ....... G06F 19/3462 705/14.66 |
| 2011/0066504 | A1 | 3/2011 | Chatow |
| 2011/0106721 | A1 | 5/2011 | Nickerson |
| 2011/0276385 | A1 | 11/2011 | Keller |
| 2011/0290871 | A1 | 12/2011 | Jon |
| 2012/0005105 | A1* | 1/2012 | Beier .................... G06Q 10/06 705/303 |
| 2012/0136698 | A1 | 5/2012 | Kent |
| 2012/0136739 | A1 | 5/2012 | Chung |
| 2012/0173351 | A1 | 7/2012 | Hanson |
| 2012/0271712 | A1 | 10/2012 | Katzin |
| 2013/0138491 | A1 | 5/2013 | Gao |
| 2013/0173428 | A1 | 7/2013 | Moser |
| 2013/0191180 | A1 | 7/2013 | Teo |
| 2013/0346235 | A1 | 12/2013 | Lam |
| 2014/0081795 | A1 | 3/2014 | Badt |
| 2014/0089142 | A1 | 3/2014 | Jackovin |
| 2014/0263674 | A1* | 9/2014 | Cerveny .......... G06K 19/06028 235/494 |
| 2015/0199741 | A1* | 7/2015 | Lucas ................ G06Q 30/0258 705/26.61 |

OTHER PUBLICATIONS

PCT; App. No. PCT/US2015/042581; International Search Report and Written Opinion dated Oct. 9, 2015.

* cited by examiner

Products In Selected Buy Trip

BIG MULTICOLOR TWEEN COOL SING ALONG KARAOKE
BIG MULTICOLOR TWEEN COOL SING ALONG KARAOKE
OBIGING TEA PARTY SET
BYG 26" KETTLE CHARCOAL GRILL
BYG 26" KETTLE CHARCOAL GRILL
BYG 17.5" CHAR GRIL
BYG 17.5" CHAR GRIL
BYG 17.5" CHAR GRIL
BYG 17.5" CHAR GRIL
BYG 17.5" CHAR GRIL
FOOTWEAR MENS LEATHER ATHLETICS - JAKE WW
FOOTWEAR INFANTS SYNTHETIC CASUAL SHOES - STORE A 6WI
FOOTWEAR MENS LEATHER ATHLETIC LOW - LORI
FOOTWEAR INFANTS SYNTHETIC DRESS SHOES-PEGGY
FOOTWEAR MISSES SYNTHETIC DRESS SHOES-PEGGY
FOOTWEAR MENS LEATHER ATHLETICS - SAM
FOOTWEAR WOMENS LEATHER ATHLETICS - PROFESSOR
FOOTWEAR BIG BOYS LEATHER ATHLETICS - PROFESSOR
FOOTWEAR MENS LEATHER ATHLETICS - TUCK-O-RAMA BLK
WOMENS LEATHER BOOTIE - CONNIE 1800
1802

FIG. 18

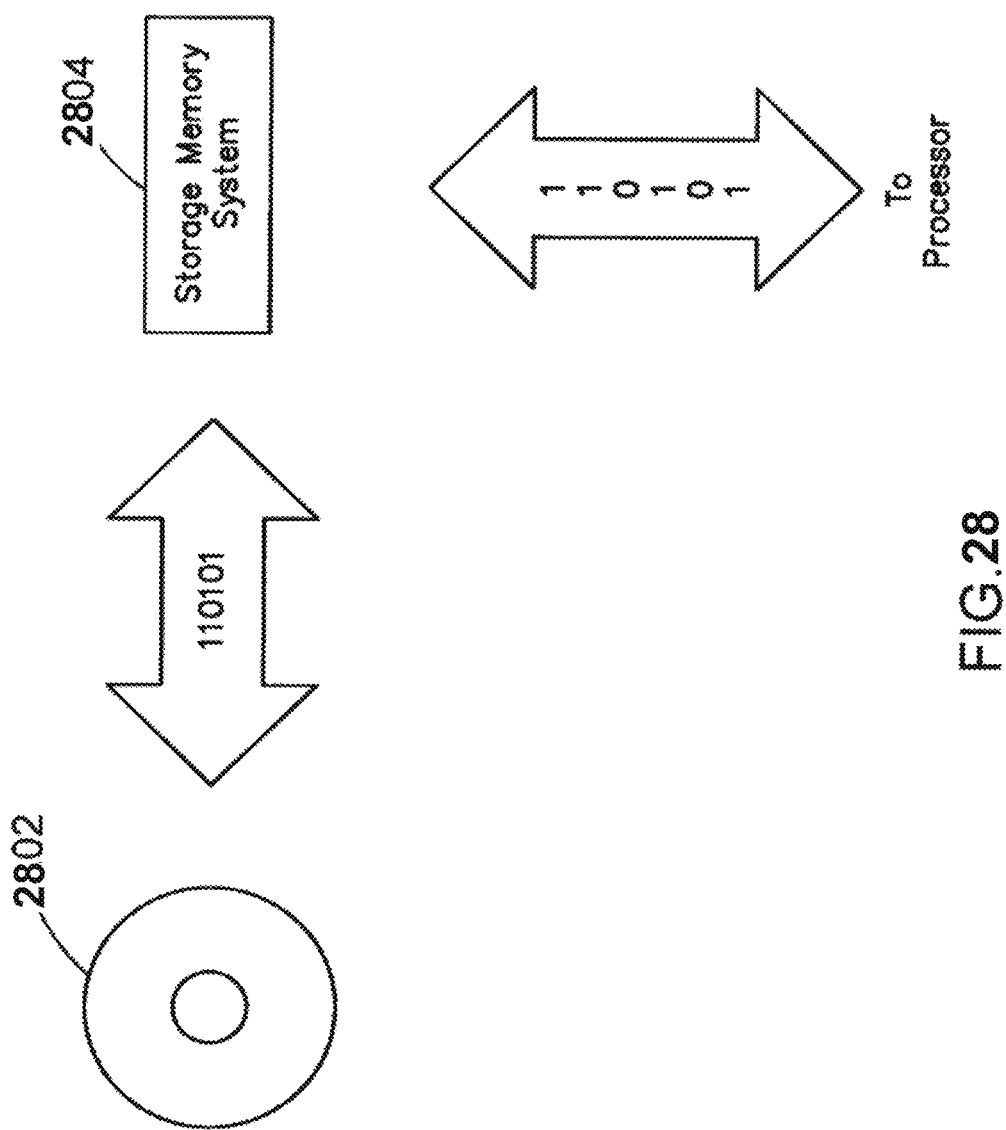

SYSTEM AND METHOD FOR SUPPLY CHAIN MANAGEMENT

RELATED APPLICATION(S)

This application is a continuation-in-part of International Application No. PCT/US2015/042581, filed Jul. 29, 2015, entitled SYSTEM AND METHOD FOR SUPPLY CHAIN MANAGEMENT, which claims the benefit of U.S. Provisional Application No. 62/030,711, filed Jul. 30, 2014, which are incorporated by reference in their entirety herein.

BACKGROUND OF THE DISCLOSURE

Field of the Invention

Aspects of the present invention relate to a system and method for supply chain management.

Discussion of Related Art

In a typical supply chain of a retail environment, a buyer, or a buyer team including at least one buyer and support staff for the buyer, reviews products offered for sale by a supplier to the retail environment. The buyer reviews the products and product offers provided by the supplier. The offers provided by the supplier typically include such information as the number of units available and the price of each unit. Based on their review of the products, the corresponding product offers from the supplier, and the needs of the retail environment, the buyer and/or buyers team determines which supplier offers to accept and reject.

SUMMARY

Embodiments described herein provide a more efficient and cost effective system and method for supply chain management. The improved system and method for supply chain management enables buyers, via a mobile device, to more easily and rapidly make purchasing decisions on products and share/receive information related to products. It virtualizes a current sample tag, provides a data store for notes and photos that can be shared with other associates in real-time, and allows for purchase decisions to be shared, via the system, in real time.

According to at least one embodiment described herein, a system is provided that is a tool for buyers of a supply chain to easily and efficiently scan a product being reviewed during a buy trip, retrieve information related to the scanned product, and transmit a product offer status update to a supply chain management server in real time. The buyer may also use the tool to share buyer-generated information (e.g., buyer generated notes or photographs) related to the scanned product with members of a buyer-support team not present with the buyer and/or with the supply chain management server.

For example, one aspect of the present invention is directed to a device for supply chain management, the device comprising a scanner configured to record an identification code associated with a sample product, a supply chain management module coupled to the scanner, and a network interface coupled to the supply chain management module, wherein the supply chain management module is configured to retrieve the identification code from the scanner, transmit the identification code to a supply chain management server via the network interface, receive product offer information related to the sample product from the supply chain management server via the network interface, and transmit a product offer status update related to the sample product to the supply chain management server via the network interface.

According to one embodiment, the device further comprises a display coupled to the supply chain management module, wherein the supply chain management module is further configured to provide the received product offer information to the display. In one embodiment, the supply chain management module is further configured to receive product information related to the sample product from the supply chain management server and to provide the received product information to the display. In another embodiment, the supply chain management module is further configured to provide a supply chain management tool to the display, and to generate the product offer status update based on user interaction with the supply chain management tool.

According to another embodiment, the supply chain management module is further configured to transmit buyer-generated information to the supply chain management server via the network interface, the buyer-generated information based on user interaction with the supply chain management tool. In one embodiment, the buyer-generated information includes at least one of a buyer note and a photograph related to the sample product. In another embodiment, the supply chain management module is further configured to transmit the buyer-generated information to a member of a buyer support team via the network interface.

Another aspect of the invention is directed to a method for managing a supply chain, the method comprising acts of retrieving, with a scanner of a mobile device, an identification code associated with a sample product, transmitting, with a supply chain management module of the mobile device, the identification code to a supply chain management server via a network interface of the mobile device, receiving, with the supply chain management module via the network interface, product offer information related to the sample product from the supply chain management server, and transmitting a product offer status update related to the sample product to the supply chain management server via the network interface.

According to one embodiment, the method further comprises an act of receiving, with the supply chain management module, product information related to the sample product from the supply chain management server via the network interface. In another embodiment, the method further comprises an act of displaying at least one of the product offer information and the product information to a buyer via a display of the mobile device.

According to another embodiment, the method further comprises acts of providing, with the supply chain management module, a supply chain management tool to the display, and generating the product offer status update based on the buyer's interaction with the supply chain management tool. In one embodiment, the acts of generating the product offer status update and transmitting the product offer status update are performed in real time. In another embodiment, the method further comprises an act of receiving, via the buyer's interaction with the supply chain management tool, buyer-generated information related to the sample product.

According to one embodiment, the act of receiving buyer-generated information comprises receiving a buyer-generated note related to the sample product. In one embodiment, the act of receiving buyer-generated information comprises receiving an uploaded photograph related to the sample product. In another embodiment, the method further comprises an act of transmitting the buyer-generated information to the supply chain management server via the network interface. In one embodiment, the method further comprises an act of transmitting the buyer-generated information to at least one member of a buyer support team via the network interface. In another embodiment, the acts of receiving buyer-generated information related to the sample product and transmitting the buyer-generated information to the at least one member of the buyer support team are performed in real time. In one embodiment, the method further comprises an act of updating, with the supply chain management server based on the product offer status update, a product offer stored in an offer database related to the sample product.

At least one aspect of the invention is directed to a non-transitory computer-readable medium encoded with instructions for execution on a distributed computer system within a supply chain, the instructions when executed, performing a method comprising acts of retrieving, with a scanner of a mobile device, an identification code associated with a sample product, transmitting, with a supply chain management module of the mobile device, the identification code to a supply chain management server via a network interface of the mobile device, receiving, with the supply chain management module, product offer information related to the sample product from the supply chain management server via the network interface, and transmitting a product offer status update related to the sample product to the supply chain management server via the network interface.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 18 is a screenshot view of a current buy trip review GUI in accordance with at least one embodiment described herein;

FIG. 28 is a block diagram of a computer data storage system with which various embodiments of the invention may be practiced.

DETAILED DESCRIPTION

Figure 1:
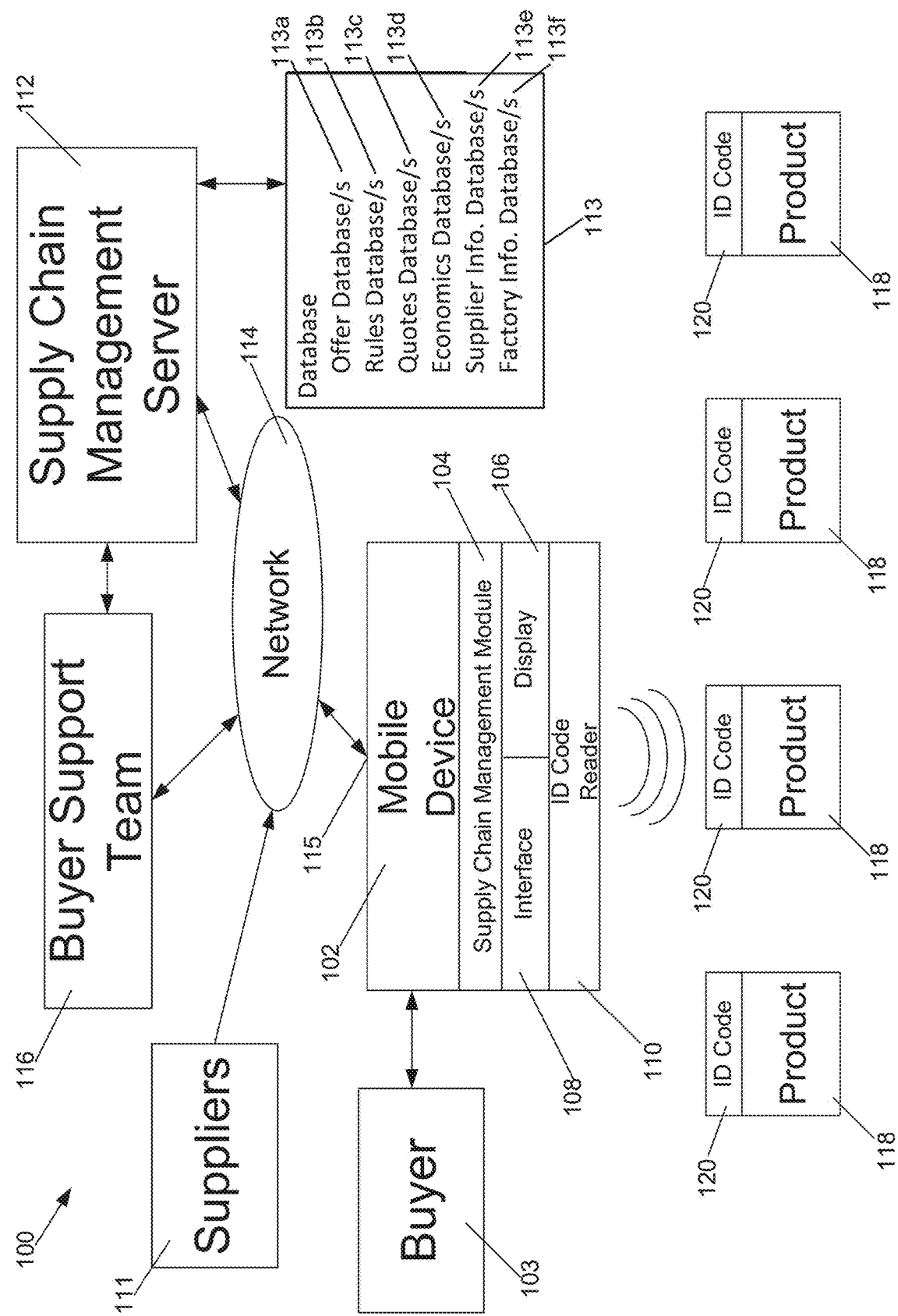
FIG. 1 is a block diagram illustrating a system for supply chain management in accordance with at least one embodiment described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, in a typical supply chain of a retail environment, a buyer, or a buyer team including at least one buyer and support staff for the buyer, reviews products offered for sale by the supplier to the retail environment, reviews product offers from the supplier, and based on their review of the offered products, the product offers, and the needs of the retail environment, the buyer and/or buyers team determines which supplier product offers to accept and reject.

In current offer review processes, a buyer gathers information related to offered products, reviews the gathered information, and indicates offer decisions related to the offered products by generating a sample tag for each product being reviewed. The sample tag generated by the buyer, or the buyer's support staff, for each product may include information related to the product and the supplier offer such as the number of units available, the offered price per unit, related costs associated with the offer, supplier information, characteristics of the product, manufacturing information, offer decisions, buyer notes or any other information related to the product or supplier offer. In common review processes, a buyer, or the buyer's support staff, utilizes a computer system to generate the sample tag for each product being reviewed. In some situations, the buyer, or buyer's support team, utilizes the computer system to print out the sample tag and affixes a sample tag (including the product and offer information and/or any offer decisions) to each offered product. Such sample tags are oftentimes difficult to read. In addition, the computer systems utilized by buyers, or a buyer's support team, to generate the sample tags are generally large and in situations where the buyer, or buyer's support team, is reviewing offered products in a large warehouse, the use of such a large and cumbersome system may be inefficient and impractical.

Additionally, in current buyer review processes, the buyer is not able to quickly share information regarding the reviewed products to other members of the buyer team or other associates of the retail environment that are not present with the buyer. If a buyer has information (e.g., photos or notes) related to the reviewed products that he would like to share with a desired team member or associate, the buyer must wait until he/she is able to pass a sample tag (including the desired information) to, or otherwise communicate with, the desired team member or associate. Similarly, the buyer is also not able to quickly receive information regarding the reviewed products from other members of the buyer team or other associates of the retail environment that are not present with the buyer.

Finally, in current buyer review processes, the buyer is not able to immediately change the status of a product offer from the supplier (e.g., from offer status to quote status). For example, the buyer may indicate an offer decision on a sample tag; however, the status of the offered product will not actually change until the buyer, or a member of the buyer team, upon reviewing the offer status on the sample tag, updates the status of the product in a supply chain management system (SCMS) that maintains the status of each offered product.

Accordingly, as described herein, a more efficient and cost effective system and method for supply chain management is provided. The improved system and method for supply chain management enables buyers, for a retail environment, to more easily and rapidly make purchasing decisions on products. It virtualizes a current sample tag, provides a data store for notes and photos that can be shared with other associates in real-time, and allows for purchase decisions to be shared, via the system, in real time as well.

FIG. 1 is a block diagram illustrating a system for supply chain management of a retail environment in accordance with at least one embodiment described herein. The system 100 includes a mobile device 102, a supply chain management server 112, and an offer database 113. The mobile device 102 includes a supply chain management module 104, an interface 108, a display 106, a network interface 115, and an ID code reader 110. In one embodiment, the mobile device 102 is a mobile phone; however, in other embodiments, the mobile device 102 may be any other type of mobile device (e.g., a laptop, tablet computer, etc.). The supply chain management module 104 is configured to communicate with the interface 108, the display 106 and the ID code reader 110.

The mobile device 102 is configured to communicate with the supply chain management server 112 via the network interface 115 and one or more communications and/or computer networks 114. In one embodiment, the network interface 115 is a wireless transmitter (e.g., an antenna). In another embodiment, the network interface is a hardwired connection (e.g., an Ethernet port). In one embodiment, the network 114 is a wireless network (e.g., a Wi-Fi based network, a cellular network, or some other wireless network); however in other embodiments, the network 114 may be a wired network. In one embodiment, the network 114 is a Local Area Network (LAN) (e.g., an Ethernet based network); however, in other embodiments, the network 114 is a Wide Area Network (WAN) (e.g., the Internet). In other embodiments, the network 114 is a combination of multiple types of networks (e.g., a combination of a Wi-Fi based network and the Internet).

The supply chain management server 112 maintains the databases 113 (e.g., offer databases 113a, rules databases 113b, quotes databased 113c, economic parameter databases 113d, supplier information databases 113e, factory information databases 113f, political conditions parameters databases 113g, environmental conditions databases 113h, other such databases, and typically a combination of two or more of such databases). For example, an offer database 113a includes each product offer provided by a supplier 111 to the retail environment. In one embodiment, the supply chain management server 112 receives product offers from suppliers 111 via the network 114; however, in other embodiments, the supply chain management server 112 may receive product offers from suppliers, either directly or indirectly, via any other appropriate method. The supply chain management server 112 stores each product offer in the offer database 113a including information related to the product and the supplier offer such as the number of units available, the offered price per unit, related costs associated with the offer, supplier information, characteristics of the product, manufacturing information, or any other information related to the product or supplier offer.

A buyer 103 for the retail environment reviews products 118 offered by the supplier 111 (i.e., products 118 corresponding to product offers stored in the offer database 113a). The buyer 103 utilizes the mobile device 102 to assist in the review process. The supply chain management module 104 provides a supply chain management tool to the buyer 103 via a Graphical User Interface on the display 106. The buyer 103 may interact with the GUI via the interface 108 and the ID code reader 110 to retrieve information related to the offered products 118, to retrieve information related to the product offers stored in the database 113a, to provide additional information regarding the products 118, and/or to provide decisions regarding the product offers.

Each product 118 includes an associated ID code 120. In one embodiment, the ID code 120 is a barcode such as a Universal Product Code (UPC); however, in other embodiments, the ID code 120 may be another type of ID code such as a Quick Response (QR) code or a sample code. While reviewing a product 118, the buyer 103 operates the ID code reader 110 of the mobile device 102 to scan and retrieve the ID code 120 of the product 118. In one embodiment, the ID code reader 110 is a barcode scanner; however, in other embodiments, the ID code reader 110 may be some other ID scanner such as a QR code reader or a camera, RFID reader, and/or other such ID readers.

Upon retrieving the ID code 120 of the product 118, the supply chain management module 104 transmits the retrieved ID code 120 to the supply chain management server 112 via the network 114. In response to receiving the ID code 120, the supply chain management server 112 retrieves, from the one or more databases 113, information related to the product 118 associated with the received ID code 120 and information related to the product offer associated with the received ID code 120. In some embodiments, the supply chain management server accesses one or more sets of rules applied in evaluating products, corresponding offers and other information in preforming at least an automated preliminary authorization or preliminary rejection of an offer or aspect of an offer. The rules may be maintained, updated and tracked on a database, a rules engine, or the like. The supply chain management server applies the rules to improve the evaluation of product offers, quotes, bids, and to improve the acceptance and rejection over human decisions by being able, in part, to access additional information, access that information in a time that can be used in making business decisions that typically were unable to be considered by humans even if they had access to the information. Further, the supply chain management server evaluates that information relative to one or more sets of rules to provide improved evaluations and automate at least preliminary authorizations or rejections that previously could not realistically be done or that were done by buyers and/or buyer teams through a different process and using less information and typically applying different and often less accurate considerations. The applied rules are limited to available information, and often are further limited by user defined parameters (e.g., buyer set thresholds, department set thresholds, etc.). Further, the rules are further limited to automating limited decisions, and in at least some instances can be overridden by a buyer, supervisor, or the like. The supply chain management server 112 can further transmit some or all of the information retrieved from the one or more databases 113 back to the mobile device 102 via the network 114. The information received back from the supply chain management server 112 is provided to the buyer 103 via the display 106 and the GUI of the supply chain management tool.

By providing the automated preliminary authorization or rejection, the supply chain management server can automate at least part of the decision process by access data and in some instances large amounts of data that cannot be processed by the buyer or buyer team within a reasonable time period to make the needed business decisions. Further, the supply chain management server can evaluate product offers, quotes, products, suppliers, environmental conditions, economic parameters, political parameters and/or other such information relative to multiple different sets of rules, which typically cannot be considered by a buyer or buyer team within a reasonable amount of time to make a business decision, and implements the rules in a different way than a buyer and/or buyer team would evaluate the parameters. Further, buyers and/or buyer teams may not fully consider current conditions or parameters that may have changed since a quote was received, a buy decision was made, or the like.

In some embodiments, the supply chain management server 112 can receive a notification of a buyer scanning a product being offered by a supplier, receive a quote from a supplier, receive a purchase order by a department, and/or other actions that trigger an automated current evaluation on current parameters and conditions that may affect the business decisions on whether to accept an offer, authorize the purchase, or the like. Based on the product information the supply chain management server can access the one or more databases of information, and the one or more sets of rules to evaluate the quote, offer or business decision based on current parameters and conditions. For example, the supply chain management server can access product information and one or more sets of rules to determine whether a factory or factories scheduled to produce a product is in compliance with a retailer's standards, is capable of producing the quantities of product on time, whether there are conditions that may affect shipment of products and the like. As a further example, one factory rules may access factory audit data (e.g., size of facility, numbers of employees, numbers of machines, whether child labor was being used, whether waste is properly being disposed of, and/or other such factory audit data). The factory rules can be applied to the factory audit data to determine whether one or more thresholds are met, whether one or more conditions exist or previously existed, and the like. Based on the application of the factory rules, the supply chain management server may generate an automated authorization to proceed with a business decision or automated rejection of a business decision. As another example, quality standards rules and/or review rules may be applied to product information corresponding to the identified product and/or products manufactured by a factory and/or provide by a particular supplier. Based on the rules and current existing parameters, the supply chain management server can provide an automated authorization or an automated rejection of the product (e.g., when threshold standards are not met).

Some embodiments further apply cost rules to products and/or buying decisions. Such cost rules may include one or more cost thresholds. In some instances, one or more cost thresholds may be set by a buyer, a department of a retail store, a management entity or the like. The supply chain management server may be configured to evaluate the user set cost thresholds relative to one or more cost rules in determining whether the cost threshold is in compliance with one or more current guidelines specified by a retail management, and provide an automated approval or rejection of the cost threshold.

In some embodiments, the supply chain management server receives product identifier information in response to the buyer scan of the product, and can retrieve corresponding product information. The supply chain management server can apply the cost rules to identify when products do and do not comply with the one or more cost rules and can provide auto-approval or auto-rejection independent of the buyer or buyer team. This can save significant time and resources that might otherwise be spent in buyer and/or buyer team evaluations. Further, the supply chain management server can apply product quality rules in automatically evaluating whether products comply with one or more product quality and/or review thresholds. In some instances, a buyer, buyer team, management, or other entity enters one or more product quality thresholds, which may include information about minimum reviews and the like. Upon receiving a product identifier based on the buyer's scan, the supply chain management server can access the databases of information to obtain current quality information, reviews and/or other such information that may correspond to identifying a product's quality. One or more quality rules can be applied in relation to the quality thresholds to determine whether a scanned product complies with the quality rules, and can provide an automated approval or automated rejection independent of the buyer or buyer teams' consideration. As such, the supply chain management server may save a buyer time in evaluating an offer, and/or may override a buyer and thus avoid acquiring products that are not in compliance with quality standards. In some implementations, one or more sets of rules further causes a comparison of the product with one or more other products relative to one or more parameters (e.g., cost, quality, reviews, factory parameters, and/or other such parameters).

Some embodiments further access risk rules in automatically determining whether a quote, order, product, shipment or the like is expected to exceed one or more risk thresholds and/or is associated with one or more current risk parameters. For example, the supply chain management server can use the product identifier from the scan and retrieve product information from one or more databases 113, which may include and/or be used to identify and cross reference proposed or potential shipping routes, shipping origins, shipping destinations, intermediate ports and the like relative to the risk rules and risk parameters (e.g., global risks) to determine based upon levels of risk whether to ignore risk, alert buyer, automatically reject products or orders, automatically authorize products or orders, or the like. Other risk rules may consider regions of the world where factory is located, political issues, financial data associated with a factory, supplier, shipper, or the like, natural disaster data, employment problems (e.g., compliance with child labor restrictions and/or laws), shipping concerns, and the like. Further, in some instances, a buyer or buyer team may not have final authority to authorize an order. Similarly, one or more parameters may have a predefined relationship with one or more rules and/or thresholds that trigger further evaluation relative to a supervisory level of review and/or authorization. For example, a buyer's supervisor may define one or more department level thresholds (e.g., cost, quality, risk, etc.) that may additionally or alternatively be applied relative to one or more sets of rules. In some implementations, the supervisory thresholds may override other thresholds (e.g., buyer set thresholds). The databases and/or rules may map a buyer to one or more supervisors and/or supervisory levels that are considered relative to one or more rule sets. Based on these rules the system can retrieve product information (e.g., based on the scan, received quote, offer, etc.) and evaluate current conditions and parameters relative to supervisor thresholds and other such rules to determine whether the product is automatically approved, whether notification should be communicated to one or more supervisors, whether further supervisory authorization is needed, automatically reject, or the like. In some embodiments, the supply chain management server can track and identify trends of buyer's, supervisor's and others decisions over time and can generate one or more rules consistent with those trends to identify how a buyer, supervisor, or other person will respond to one or more factors enabling the system to gradually take over more and more of the decision making surrounding edge case scenarios. Accordingly, the supply chain management server accesses and/or compiles different data relative to multiple parameters that may affect a buying decision and can automate the authorization or rejection of a buying decision.

Again, in some instances, an initial quote from a supplier may be received while a factory complies with one or more sets of rules and is authorized as a factory or supplier with which a retailer is willing to do business. Factors may change between the time of the quote, and a time an offer is to be submitted. Accordingly, the supply chain management server can automatically process the relevant product information and apply relevant one or more relevant sets of rules to determine whether the offer can be submitted, whether further authorization is needed, whether further evaluation is recommended, whether the offer should not be submitted, and the like. As such, the supply chain management server provides current evaluations when such evaluations are often disregarded.

Further, in some embodiments, the supply chain management server further accumulates and/or directs the accumulation and maintenance of some of the parameter data. One or more databases can be maintained with the parameter data. Additionally, at least some of the parameter data is maintained to ensure current and relevant information is available to be evaluated in relation to one or more products, product offers, and the one or more sets of rules. In some embodiments, the supply chain management server applies one or more sets of rules in determining which data should be maintained in one or more databases and when some data should be removed and/or indicated as no longer relevant to one or more products, product offers and the like. These rules can include time thresholds, relevancy thresholds, source thresholds, whether similar information is identified from more than a single source, and other such rules.

Still referring to FIGS. 1-2, again the buyer can use the mobile device to obtain product identifying information, such as through a scan. Relevant information can be supplied by the supply chain management server 112 to the buyer 103 via the display 106 and the GUI. This may include an automated authorization, an automated rejection, notifications, highlighting of certain information (e.g., based on one or more rules). Based on the information displayed on the mobile device 102 related to the product 118 and the product offer, the buyer 103 may be allowed to make a decision regarding whether to accept or reject the related product offer from the supplier 111, when authorized to proceed. Utilizing the supply chain management GUI provided via the display 106, and the interface 108, the buyer 103 inputs a product offer status update to the supply chain management module 104 regarding the related product offer. The buyer 103 may indicate that the product offer is approved, rejected, currently being reviewed (i.e., is pending), initiate an override of the automated authorization or rejection, and the like. The product offer status update related to the product offer is transmitted by the supply chain management module 104 back to the supply chain management server 112, via the network 114, and stored in the offer database 113a to update the product offer status in real-time.

By enabling a buyer 103 to change/update the status of a product offer in real-time as the product 118 is being reviewed, the procurement process of accepted products may begin as soon as the status is updated, as opposed to some future time when a physical sample tag is processed. Accordingly, the transition between the buyer review process and a procurement process is streamlined and made more efficient. In addition, by enabling a buyer 103 to immediately update a product offer status via the supply chain management tool, the work required by a buyer support team 116, supporting the buyer 103 in the review process, may be reduced as the buyer 103 is able to update the product offer status independent of the buyer support team 116.

In addition to enabling a buyer 103 to update product offer statuses in real-time, the supply chain management module 104 also allows the buyer 103 to share additional buyer-generated information related to the reviewed product 118 (e.g., buyer notes or photos) with another buyer, the buyer support team 116, or a supply chain management server 112 in real-time. For example, while reviewing a product 118, the buyer 103 may desire to share additional information (e.g., notes or photos) related to the product 118. The buyer 103 may provide the desired additional information to the supply chain management module 104 via the GUI on the display 106, the interface 108, and/or any other input mechanism of the mobile device 102. In one embodiment, the supply chain management module 104 transmits the additional information directly to another buyer or the buyer support team 116 via the network 114. In another embodiment, the supply chain management module 104 uploads the additional information to the supply chain management server 112, where it is stored in the offer database 113a, and accessible by another buyer or the buyer support team 116. By allowing the buyer 103 to upload additional product related information in real time, the supply chain management module 104 allows the buyer 103 to easily and quickly share information related to the reviewed products 118. Similarly, the GUI can be implemented on multiple different devices and can provide notifications to a buyer, each member of a buyer team, one or more supervisors, and others.

Figure 2:
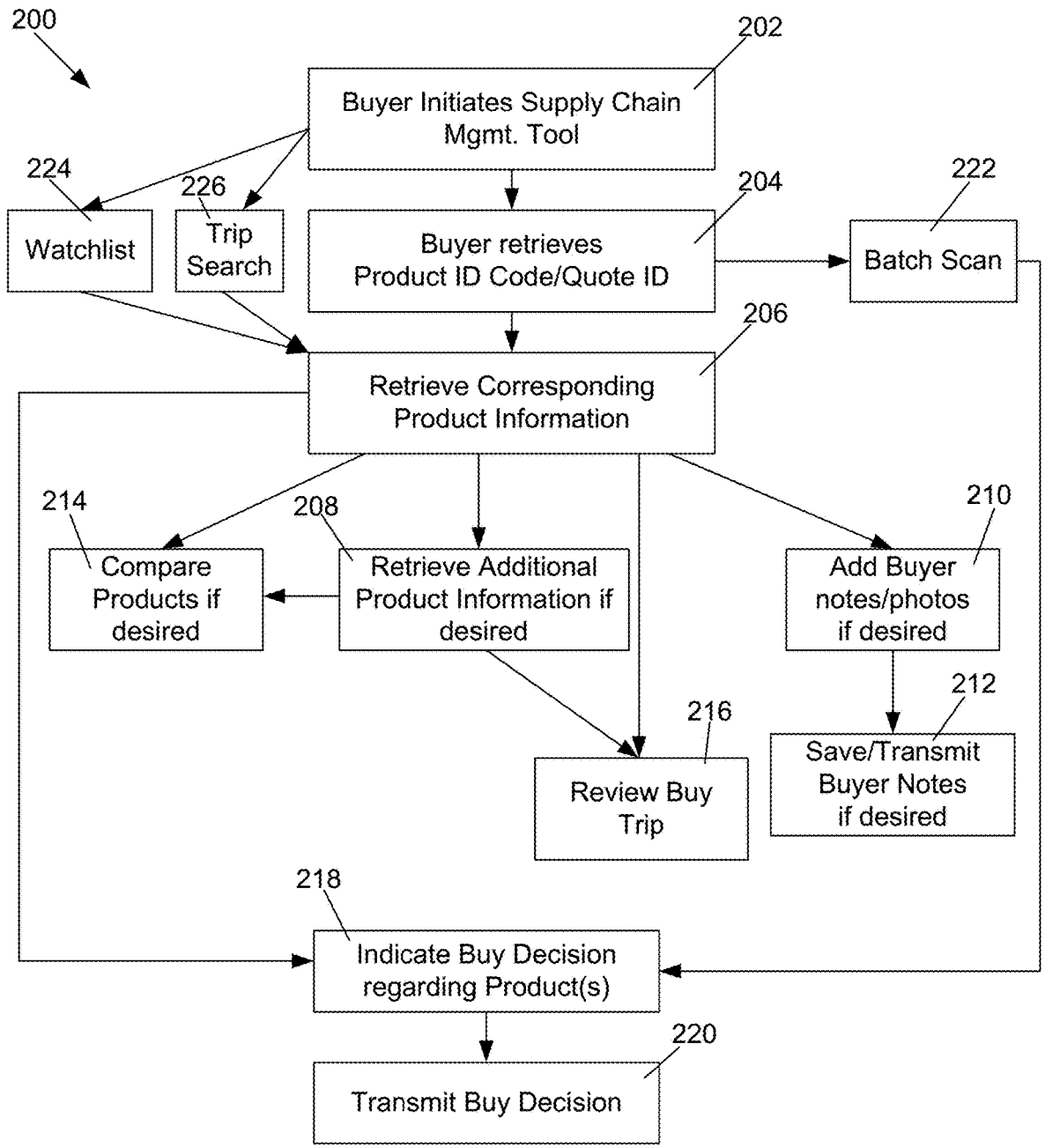
FIG. 2 is a flow chart illustrating a process for identifying elastic products in a retail environment in accordance with at least one embodiment described herein.

Operation of the supply chain management module 104 and its corresponding GUIs is described below with regard to FIGS. 2-25. FIG. 2 is a flow chart 200 illustrating a process for identifying elastic products in a retail environment in accordance with at least one embodiment described herein.

At block 202, a buyer 103 who is beginning the process of reviewing a product 118 offered by a supplier 111, operates the mobile device 102 to initiate the supply chain management tool of the supply chain management module 104. Upon initiating the supply chain management tool, the supply chain management module 104 provides a supply chain management GUI to the display 106 of the mobile device 102.

Figure 3:
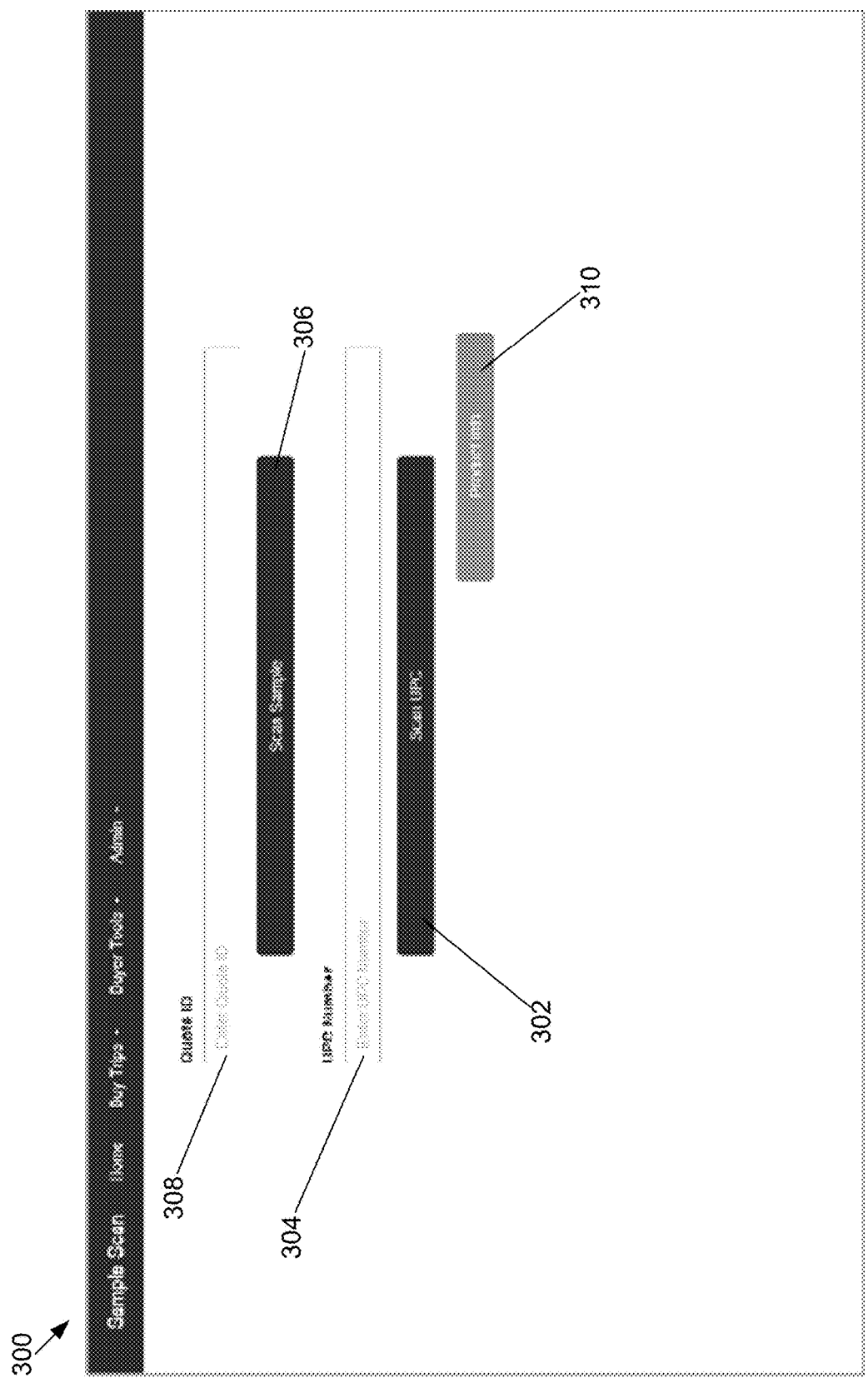
FIG. 3 is a screenshot view of a product ID code retrieval GUI in accordance with at least one embodiment described herein.

At block 204, the buyer 103 operates the supply chain management tool, via the GUI on the display 106, to retrieve an ID code 120 associated with the product 118. FIG. 3 is a screenshot view of a product ID code retrieval GUI 300 in accordance with at least one embodiment described herein. The buyer 103 operates the GUI to retrieve the ID code 120 of the product 118. In one embodiment, the buyer 103 activates the ID code reader 110 of the mobile device 102 by selecting a "Scan UPC" button 302. Upon the "Scan UPC" button 302 being selected, the ID code reader 110 retrieves the ID code information 120 incorporated in a UPC of the product 118. The retrieved ID code information 120 from the scanned UPS is displayed in a "UPC Number" box 304.

In another embodiment, the buyer 103 activates the ID code reader 110 of the mobile device 102 by selecting a "Scan Sample" button 306. Upon the "Scan Sample" button 306 being selected, the ID code reader 110 retrieves the ID code information 120 incorporated in a sample ID of the product 118. The sample ID of the products 118 may be a barcode, QR code, or some other type of identification code associated with the product offer provided by the supplier 111. The retrieved ID code information 120 from the scanned sample ID is displayed in a "Quote ID" text box 308. According to some embodiments, the buyer 103 may also operate the interface 108 (e.g., a keypad) of the mobile device to manually enter ID code information 120 into either the "UPC Number" 304 or "Quote ID" 308 text boxes. After ID code information 120 is entered into the appropriate text box 304, 308, the buyer 103 may choose to retrieve information related to the ID code 120 (and corresponding product 118) by selecting a "Product Info" button 310.

At block 206, upon the buyer 103 selecting the "Product Info" button 310, the supply chain management module 104 transmits the retrieved ID code information 120 to the supply chain management server 112 via the network 114. The supply chain management server 112 accesses one or more databases of product information, current parameter data corresponding to the product identifier and/or the offer. Further, the supply chain management server obtains and/or accesses one or more sets of rules, and applies the one or more sets of rules to the product data based on the product identifier information. Typically, some if not most of the information is not readily available to the buyer and/or cannot be processed in a reasonable amount of time by the buyer. Further, the information is often more up to date that information being considered by the buyer and/or to extensive to be considered by the buyer. Additionally, the supply chain management server can apply the rules to evaluate parameters related to the product and/or product offer, and determine based on the rules whether the product offer should be authorized. An automated authorization, rejection, notification superior authorization, and/or other such automated processing can be provided to the buyer. Further, the supply chain management server 112 can retrieve product and product offer information corresponding to the ID code 120 from the offer database 113a and transmit the corresponding product and offer information back to the supply chain management module 104 via the network 114. The notification of authorization, rejection or the like, and/or product and offer information received from the supply chain management server 112 is provided to the buyer 103 via the display 106.

Figure 4:
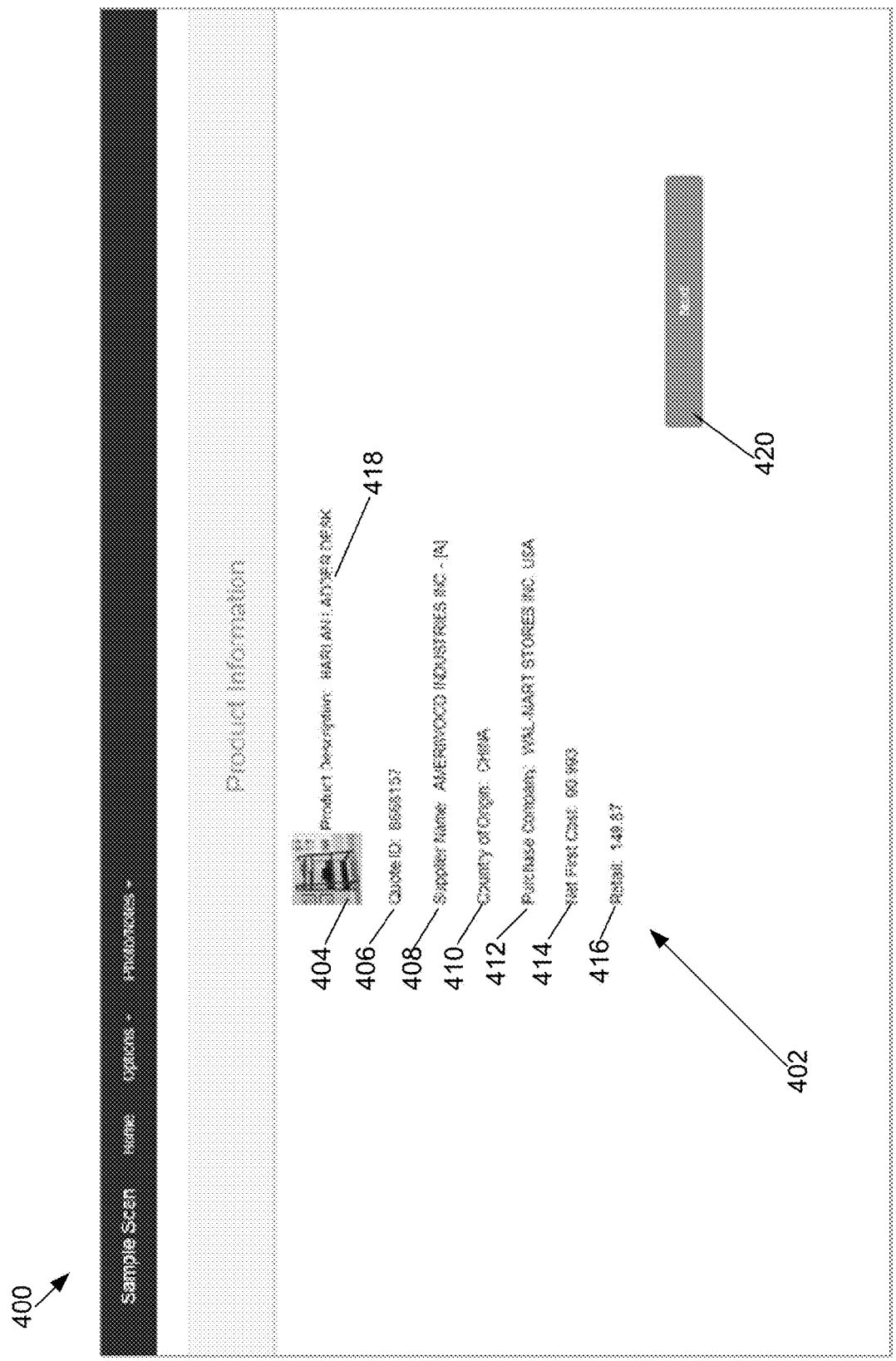
FIG. 4 is a screenshot view of a product information GUI in accordance with at least one embodiment described herein.

For example, FIG. 4 is a screenshot view of a product information GUI 400 in accordance with at least one embodiment described herein. The GUI 400 displays the product and product offer information 402 associated with the ID code 120 (and corresponding product 118) that was retrieved from the supply chain management server 112. In one embodiment, the product and offer information 402 includes an image of the product 404, the sample ID 406 associated with the product 118, the name 408 of the supplier 111, the country of origin 410 of the product 118, the name of the retail environment (i.e., the purchaser) 412, a net cost value 414, a retail cost 416, and a product description 418. However, in other embodiments, the product and offer information 402 may include any other information associated with the product 118 and corresponding supplier offer.

In some embodiments, the supply chain management server obtains one or more sets of rules to evaluate parameters related to the product offer. The rules can be applied to evaluate parameters related to the product offer and determine based on the set of rules whether the product offer should be authorized. The supply chain management server can cause a notification to be communicated in real time to the supply chain management module based on the applied first set of rules and the determination of whether the product offer should be authorized. In some instances, the notification is consistent with the determination of whether the product offer is automatically authorized. In applying the set of rules, some embodiments access current factory audit data, and evaluate the current factory audit data relative to factory condition thresholds defined in the set of rules and/or accessed from the set of rules. The supply chain management server can further apply the set of rules to identify when supervisory authorization is needed, and cause a notification of a need for the supervisory authorization to be communicated to the supply chain management module, a remote supervisory system associated with a supervisory authority associated with a buyer operating the scanner, and/or other devices. Some embodiments receive, via the buyer's interaction with the supply chain management tool, buyer-generated information related to the sample product, transmit the buyer-generated information to the supply chain management server via the network interface, and transmit the buyer-generated information to at least one member of a buyer support team via the network interface in real time.

Figure 5:
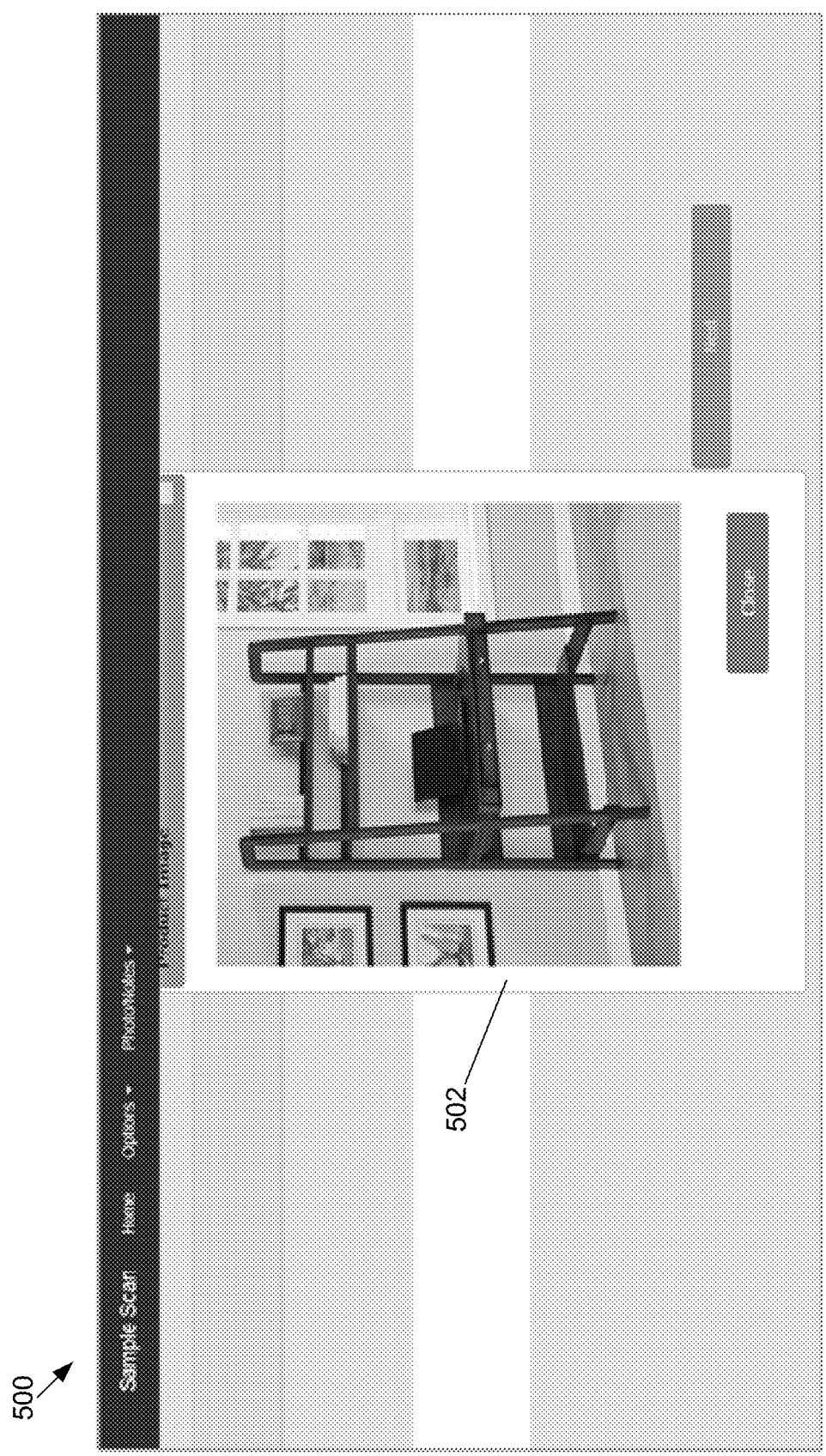
FIG. 5 is a screenshot view of an enlarged product image GUI in accordance with at least one embodiment described herein.

At block 208, the buyer 103 may operate the supply chain management tool to receive additional information related to the product 118. For example, in one embodiment, the buyer 103 may select the product image 404 and after the product image 404 is selected, the supply chain management tool generates an enlarged view of the product image. FIG. 5 is a screenshot view of an enlarged product image GUI 500 in accordance with at least one embodiment described herein. The GUI 500 displays an enlarged image 502 of the product image 404 selected by the buyer 103.

Figure 6:
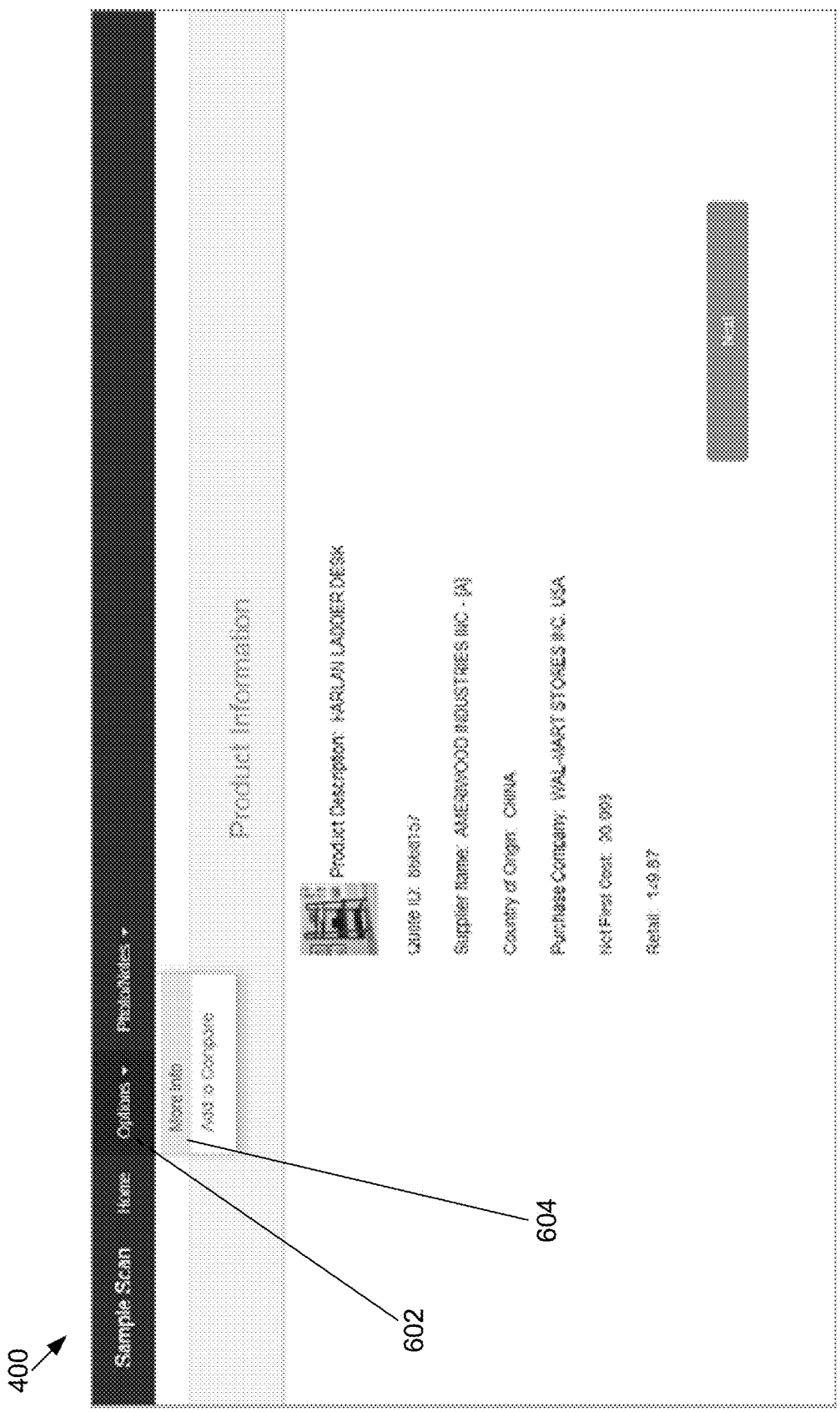
FIG. 6 is another screenshot view of a product information GUI in accordance with at least one embodiment described herein.
Figure 7:
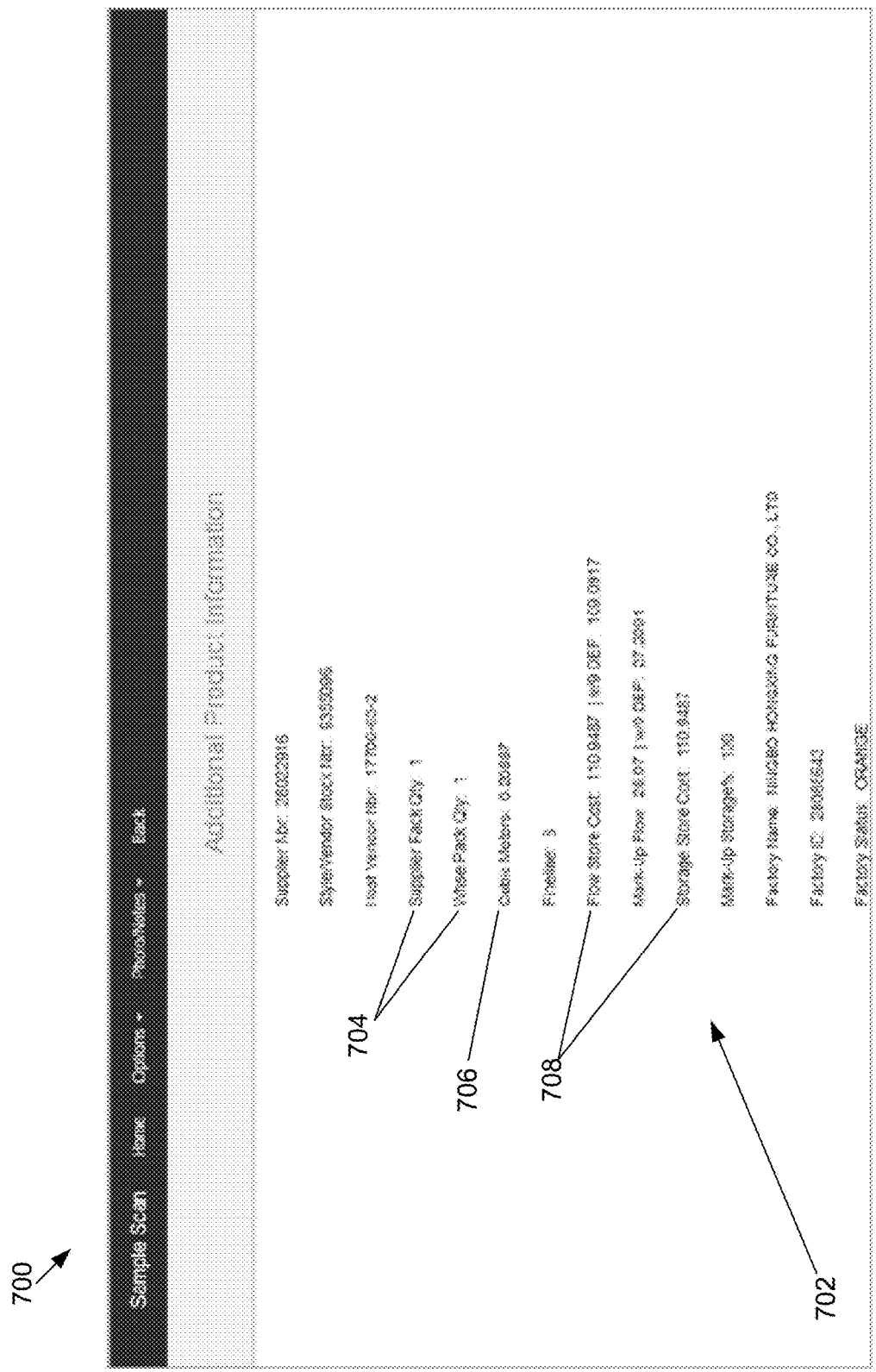
FIG. 7 is a screenshot view of an expanded product information GUI in accordance with at least one embodiment described herein.

In another embodiment, the buyer 103 may choose to display an expanded product information GUI. For example, as shown in FIG. 6, while viewing the product information GUI 400, the buyer 103 may select an "Options" tab 602. After selecting the "Options" tab 602, the buyer 103 may select a "More Info" button 604. After selecting the "More Info" button 604, an expanded product information GUI is displayed. FIG. 7 is a screenshot view of an expanded product information GUI 700 in accordance with at least one embodiment described herein. The expanded product information GUI 700 includes enhanced information 702 related to the product 118 and the product offer provided by the supplier 111. For example, the enhanced information may include such information as the number of products 118 contained within a package 704, characteristic of the product (e.g., its size) 706, estimated cost information related to the product 708, or any other information which may be useful to a buyer 103 in determining whether to accept or reject the related product offer from the supplier 111.

Figure 8:
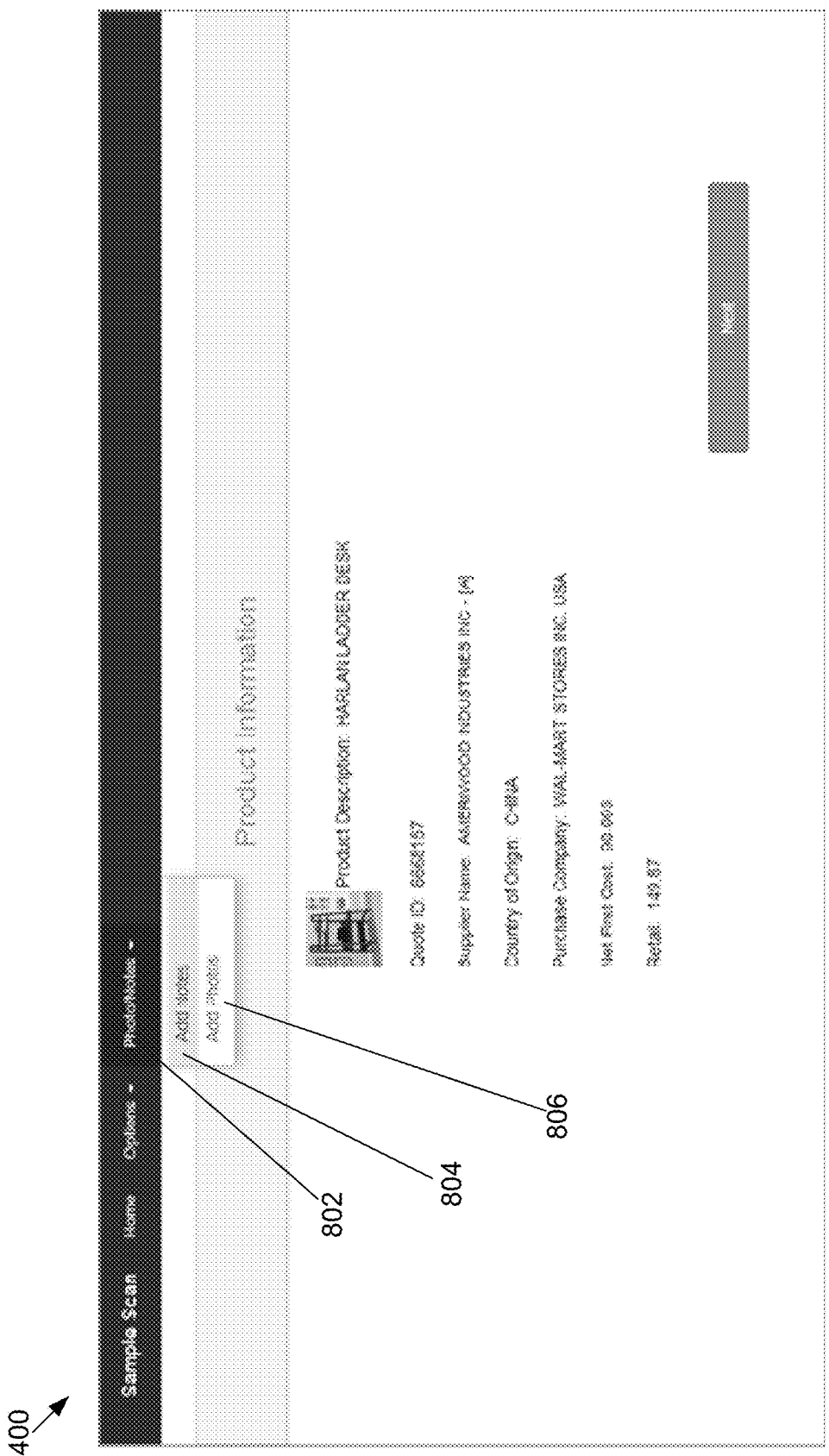
FIG. 8 is another screenshot view of a product information GUI in accordance with at least one embodiment described herein.
Figure 9:
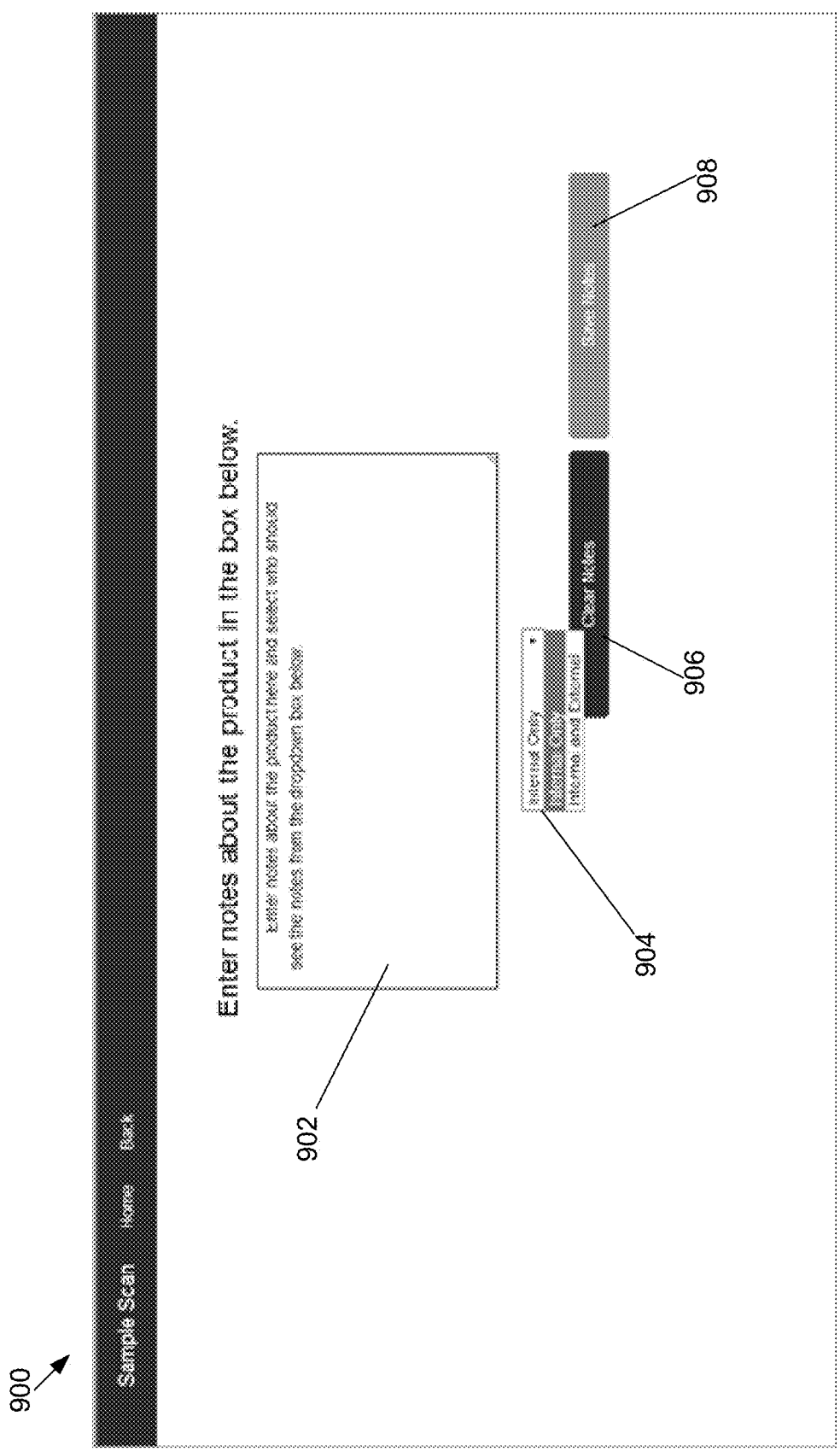
FIG. 9 is a screenshot view of a buyer notes GUI in accordance with at least one embodiment described herein.

At block 210, the buyer 103 may operate the supply chain management tool to record notes and/or upload photos related to the product. For example, as shown in FIG. 8, while viewing the product information GUI 400, the buyer 103 may select a "Photo/Notes" tab 802. After selecting the "Photo/Notes" tab 802, the buyer 103 may select either an "Add Notes" button 804 or an "Add Photos" button 806. After selecting the "Add Notes" button 804, a buyer notes GUI is displayed. FIG. 9 is a screenshot view of a buyer notes GUI 900 in accordance with at least one embodiment described herein. The buyer notes GUI 900 includes a buyer notes text box 902. Through operation of the interface 108 (e.g., a keypad or touchpad), the buyer 103 may enter desired information into the buyer notes text box 902. The buyer 103 may also utilize the access selection drop-down window 904 to select whether they want access to their notes limited to associates of the retail environment or whether they can be viewed by users external to the retail environment. The buyer 103 may also clear out the text box 902 by selecting a "Clear Notes" button 906.

Figure 10:
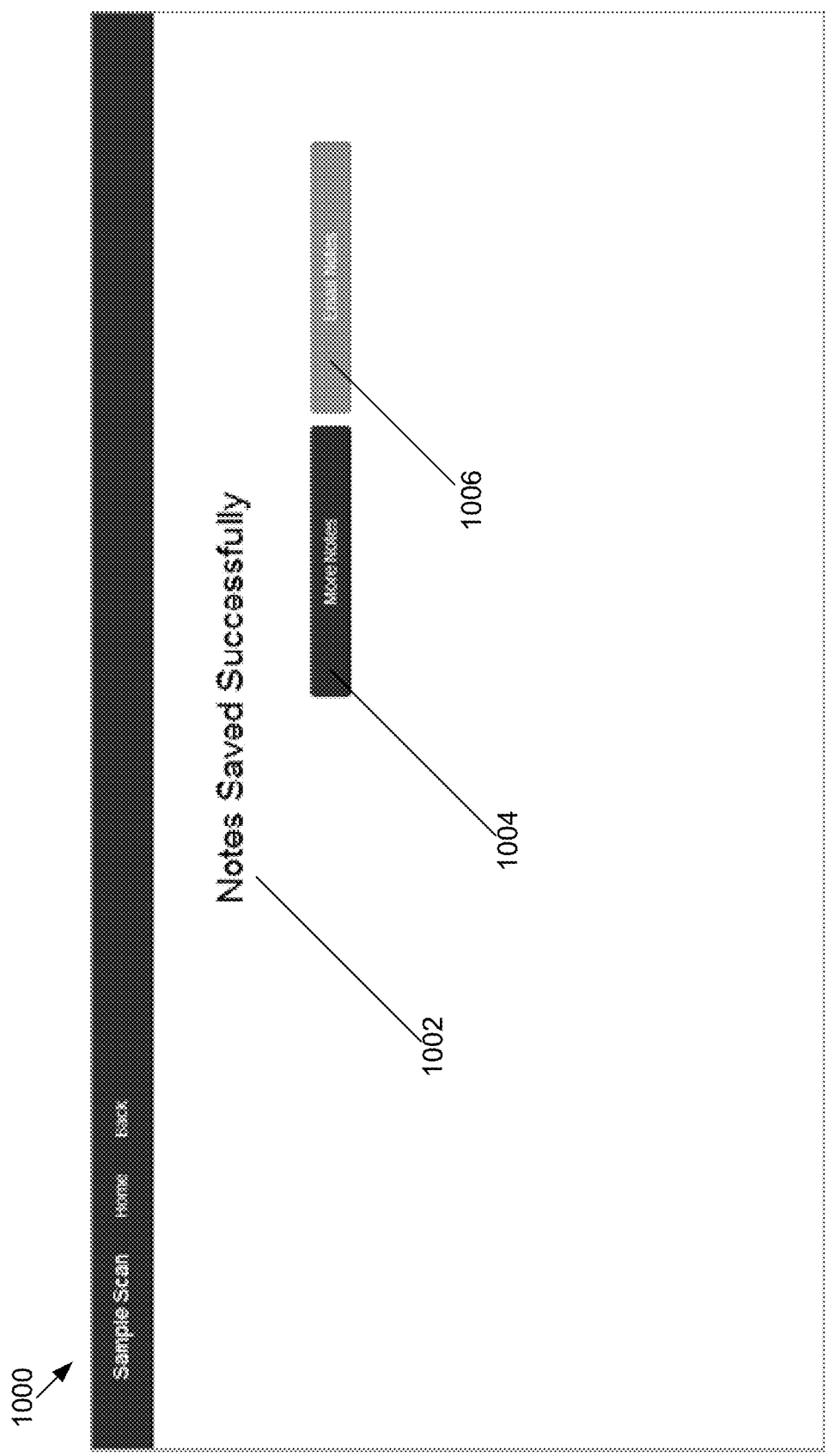
FIG. 10 is a screenshot view of a successfully saved GUI in accordance with at least one embodiment described herein.

At block 212, when the buyer 103 is finished entering notes into the text box 902, the buyer 103 may select a "Save Notes" button 908 to save the entered notes in memory. In one embodiment, the notes are saved locally to the mobile device. In another embodiment, the notes are transmitted by the supply chain management module 104 to the supply chain management server 112 via the network 114 and the supply chain management server 112 saves the notes in the offer database 113a in association with the corresponding product offer. After the notes are saved, a successfully saved GUI is displayed. FIG. 10 is a screenshot view of a successfully saved GUI 1000 in accordance with at least one embodiment described herein. The GUI 1000 includes an indication 1002 that the buyer notes have been saved successfully. The buyer 103 may choose to go back to the buyer notes GUI 900 by selecting a "More Notes" button 1004. The buyer 103 may also choose to transmit the buyer notes to a desired party by selecting an "Email Notes" button 1006.

Figure 11:
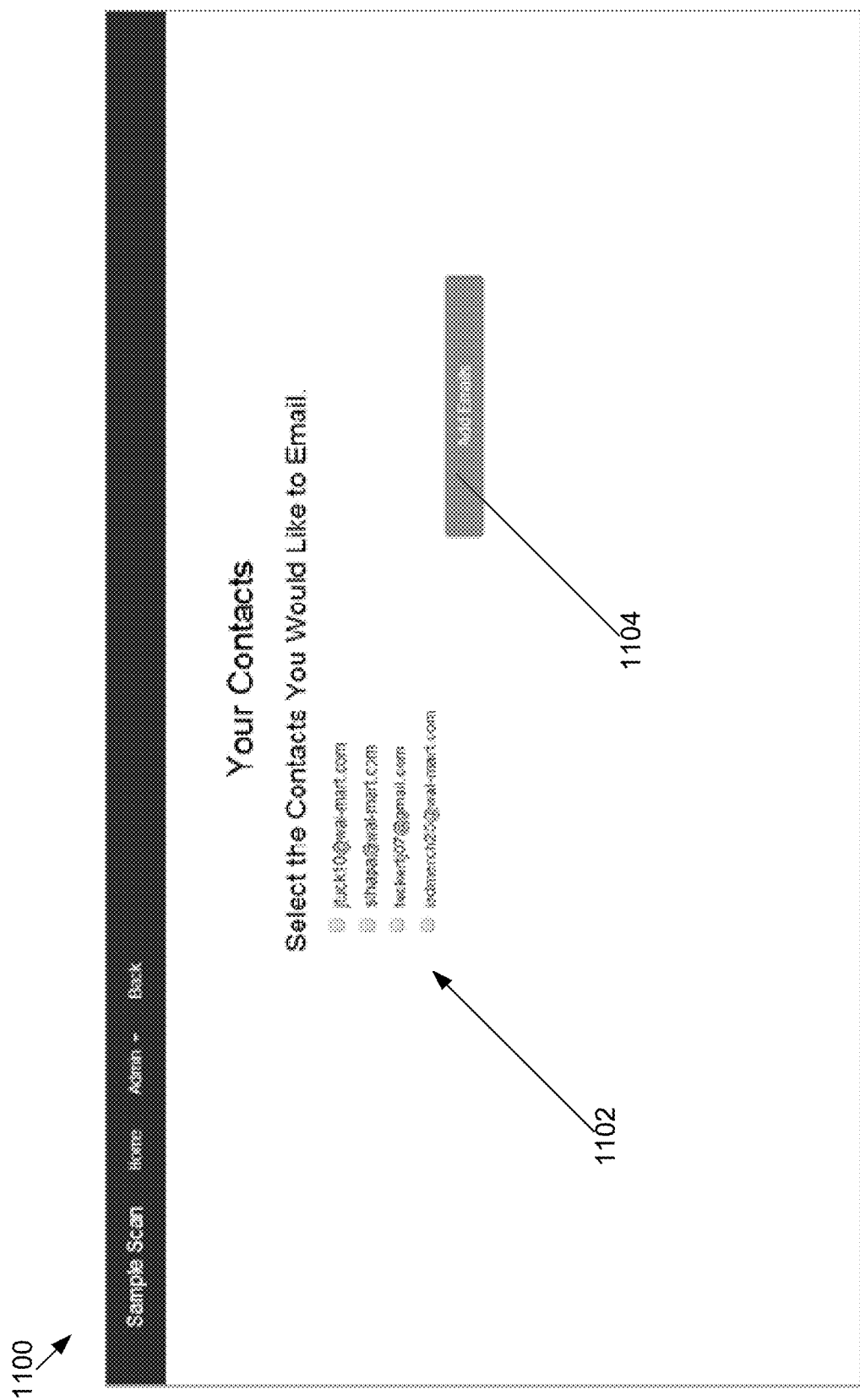
FIG. 11 is a screenshot view of a contact selection GUI in accordance with at least one embodiment described herein.

After the "Email Notes" button 1006 is selected by the buyer 103, a contact selection GUI is displayed. FIG. 11 is a screenshot view of a contact selection GUI 1100 in accordance with at least one embodiment described herein. The buyer 103 may select desired recipients of the buyer notes from a contact list 1102 displayed in the GUI 1100. In one embodiment, the contact list 1102 includes emails of potential recipients; however, in other embodiments, the potential recipients may be listed differently. In one embodiment, the selected recipients are members of the buyer support team 116; however in other embodiments, the selected recipients may be defined in any other way.

Figure 12:
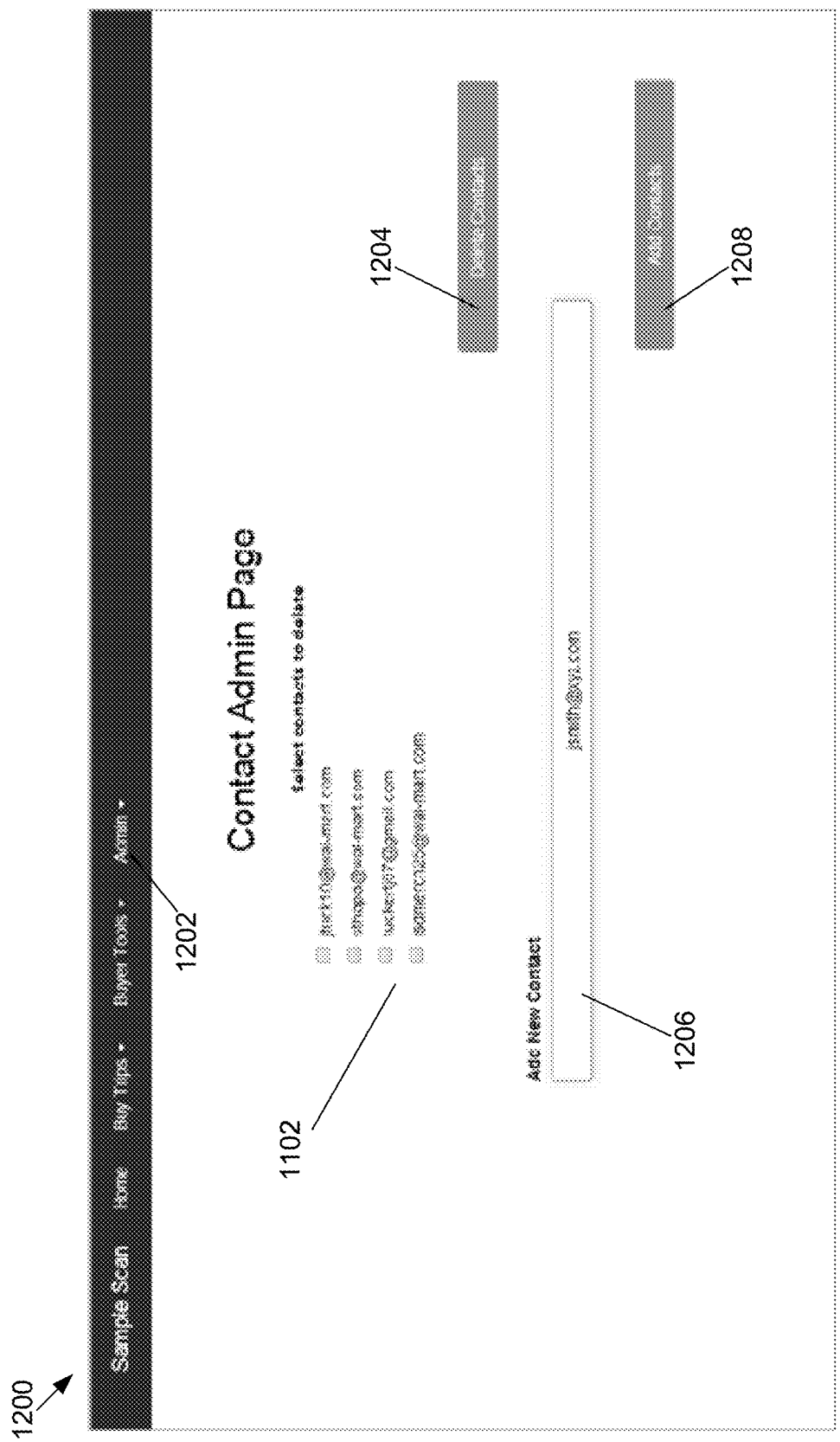
FIG. 12 is a screenshot view of a contact administration GUI in accordance with at least one embodiment described herein.

According to one embodiment, the buyer 103 may also update the contact list 1102 shown in the contact selection GUI 1100. For example, FIG. 12 is a screenshot view of a contact administration GUI 1200 in accordance with at least one embodiment described herein. The buyer 103 may access the contact administration GUI 1200 by selecting a contact administration button under an "Admin" tab 1202. The contact administration GUI 1200 includes the contact list 1102. The buyer 103 may choose to delete contacts from the contact list 1102 by selecting the desired contacts and then selecting a "Delete Contacts" button 1204. After selecting the "Delete Contacts" button 1204, the chosen contacts from the contact list 1102 are deleted. Alternatively, the buyer 103 may add contacts to the contact list 1102 by utilizing the interface 108 to add a new contact into the "Add New Contact" box 1206. After the new contact is entered into the "Add New Contact" box 1206, the buyer 103 may add the new contact to the contact list 1102 by selecting an "Add Contacts" button 1208.

Figure 13:
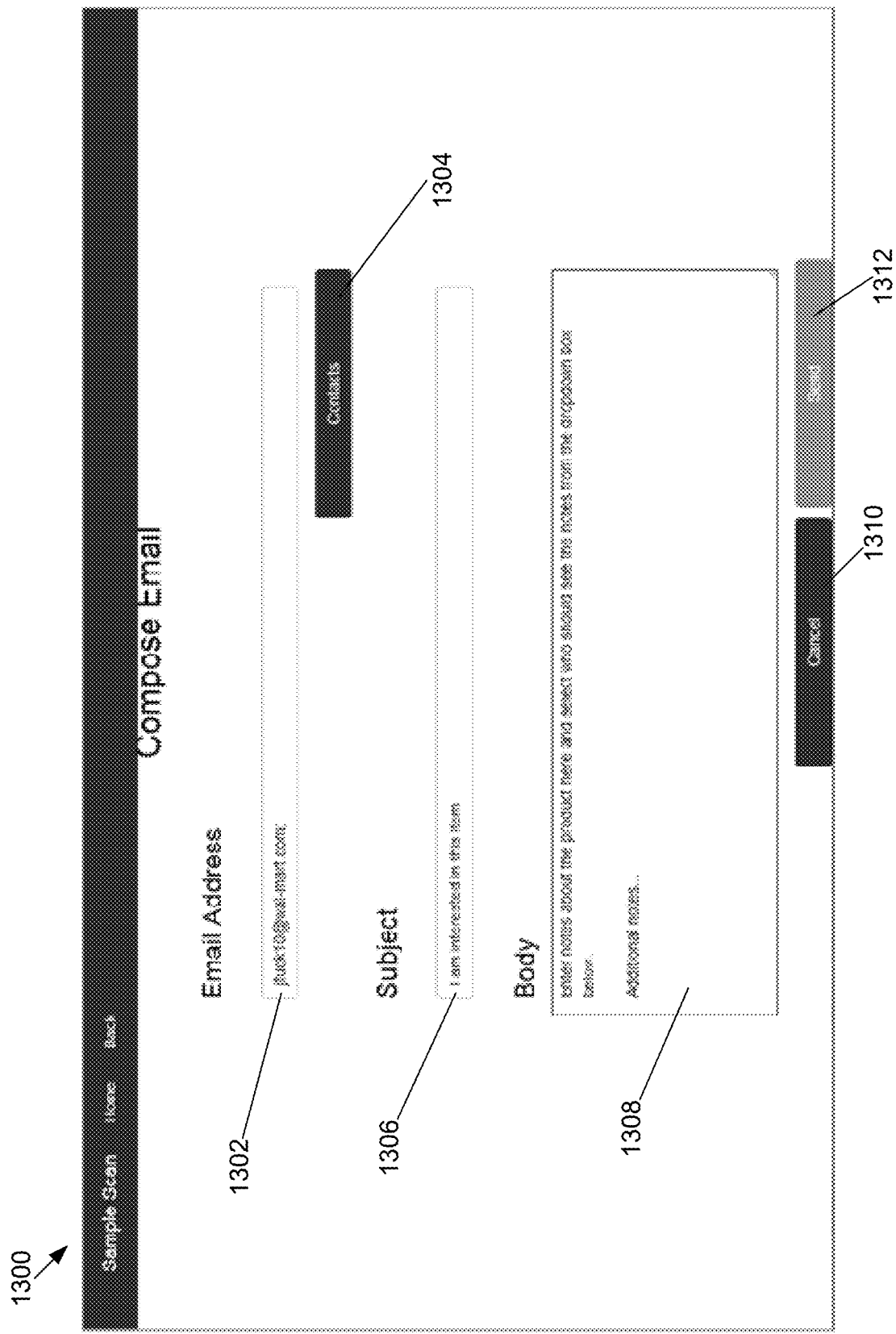
FIG. 13 is a screenshot view of an email GUI in accordance with at least one embodiment described herein.
Figure 14:
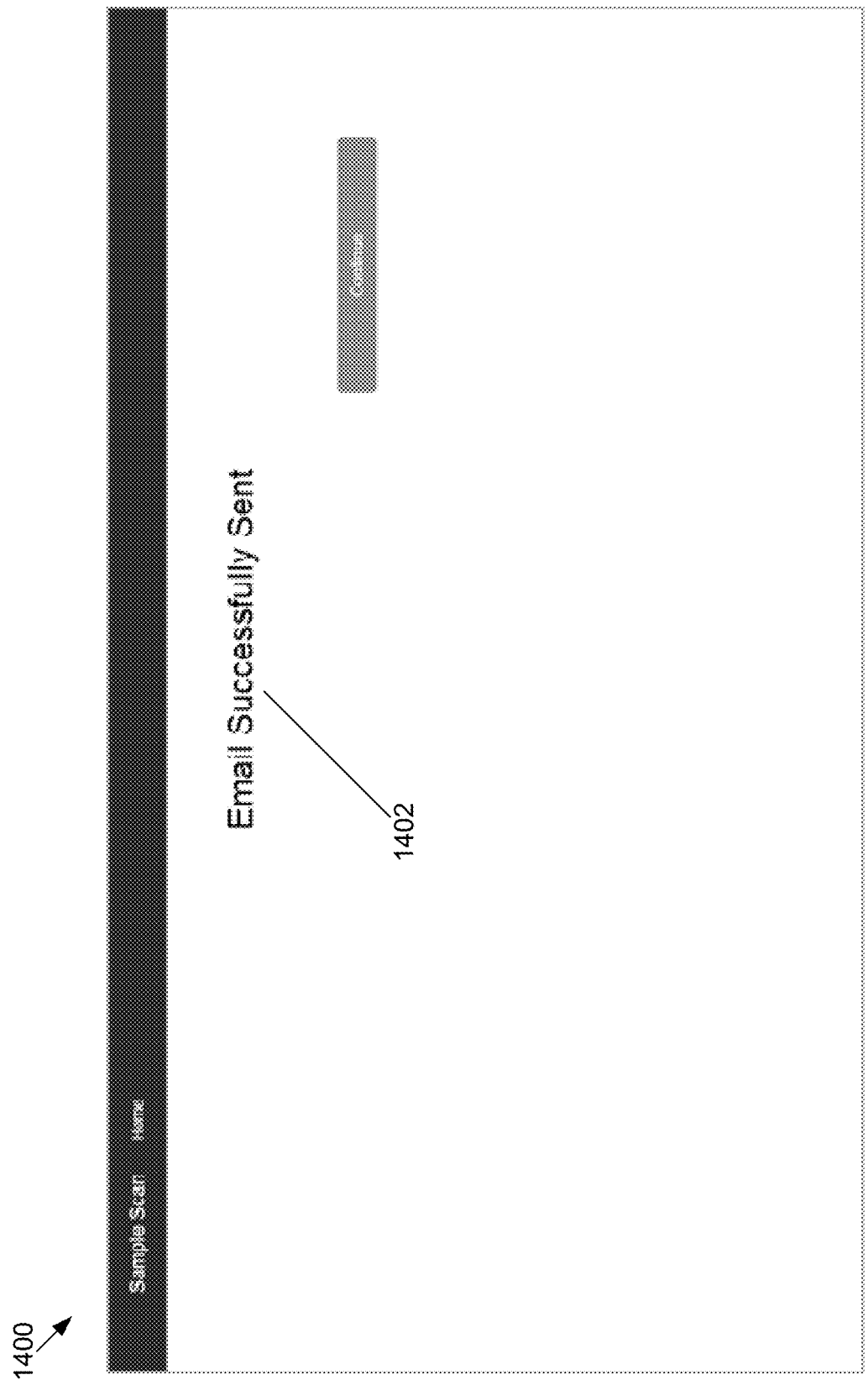
FIG. 14 is a screenshot view of an email success GUI in accordance with at least one embodiment described herein.

After selecting the desired recipients, the buyer 103 transfers the selected contacts (i.e., the selected emails) to an email GUI by selecting an "Add Emails" button 1104. FIG. 13 is a screenshot view of an email GUI 1300 in accordance with at least one embodiment described herein. When the buyer 103 selects the "Add Emails" button 1104, the selected emails are entered into an "Email Address" box 1302. The buyer 103 may choose to go back to the contact selection GUI 1100 by selecting a "Contacts" button 1304. The buyer 103 may add, through operation of the interface 108, a subject line into a "Subject" box 1306. The buyer 103 may also add, through operation of the interface 108, additional notes or text into the "Body" box 1308. The buyer 103 may choose to cancel the current email by selecting a "Cancel" button. Alternatively, the buyer 103 may choose to send the email including buyer notes to the selected recipients by selecting a "Send" button 1312. After the email is successfully sent, an email success GUI is displayed to the buyer 103. FIG. 14 is a screenshot view of an email success GUI 1400 in accordance with at least one embodiment described herein. The email success GUI 1400 includes an indication 1402 that the email was successfully sent to desired recipients.

According to one embodiment, if the buyer 103 selects the "Add Photos" button 806 of the product information GUI 400, photos can be uploaded, saved (locally or to the offer database 113a), and/or emailed to desired recipients through substantially the same process as described above with regard to buyer notes.

Figure 15:
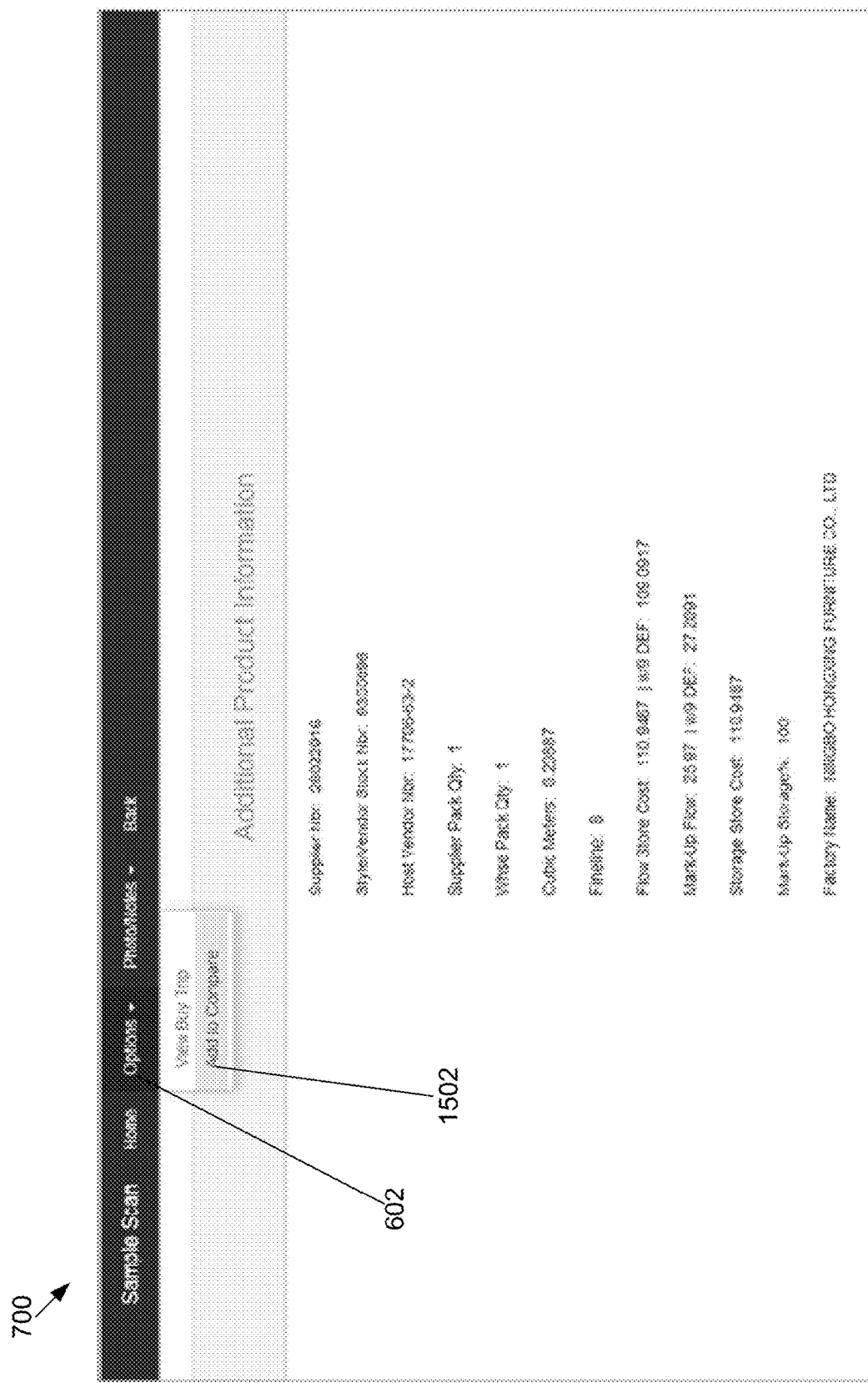
FIG. 15 is another screenshot view of an expanded product information GUI in accordance with at least one embodiment described herein.
Figure 16:
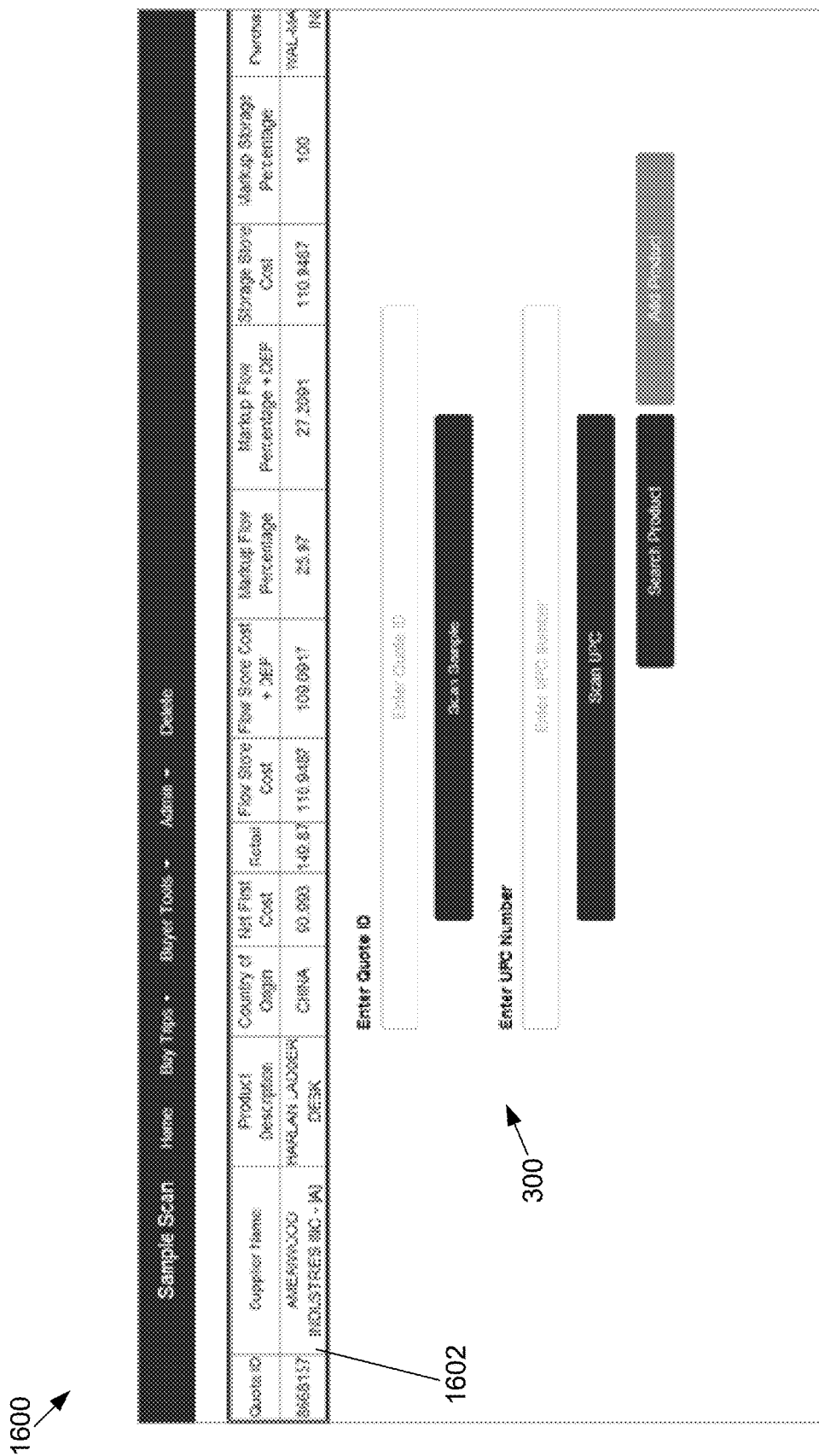
FIG. 16 is a screenshot view of a comparison GUI in accordance with at least one embodiment described herein.

At block 214, the buyer 103 may operate the supply chain management tool to compare products. For example, as shown in FIG. 15, while viewing the expanded product information GUI 700 related to a product (or the product information GUI 400 related to the product), the buyer 103 may select the "Options" tab 602. After selecting the "Options" tab 602, the buyer 103 may select an "Add to Compare" button 1502. After pressing the "Add to Compare" button 1502, the product currently being viewed is added to a comparison GUI. FIG. 16 is a screenshot view of a comparison GUI 1600 in accordance with at least one embodiment described herein. The GUI 1600 includes a table 1602 that shows the products and offer information related to the products which was chosen to be added to the comparison GUI 1600. The comparison GUI 1600 also incorporates the product ID code retrieval GUI 300, so that the buyer 103 can retrieve information related to additional products and add the additional information to the comparison GUI 1600. This way, the buyer 103 can simultaneously view product and offer information related to multiple products.

Figure 17:
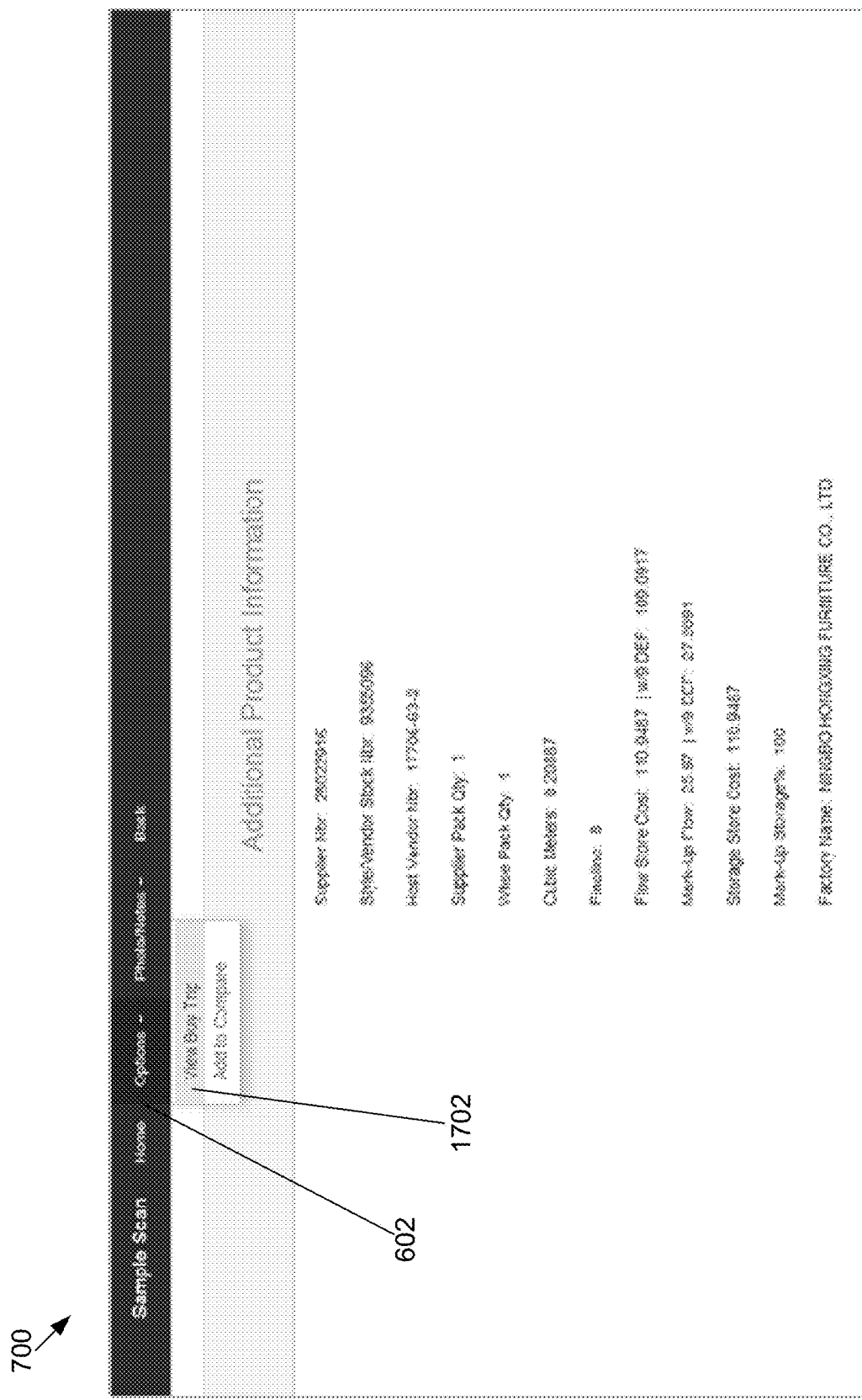
FIG. 17 is another screenshot view of an expanded product information GUI in accordance with at least one embodiment described herein.

At block 216, the buyer 103 may operate the supply chain management tool to review the current buy trip (i.e., products 118 being reviewed in the current trip by the buyer 103). For example, as shown in FIG. 17, while viewing the expanded product information GUI 700 related to a product (or the product information GUI 400 related to the product), the buyer 103 may select the "Options" tab 602. After selecting the "Options" tab 602, the buyer 103 may select a "View Buy Trip" button 1702. After pressing the "View Buy Trip" button 1702, a current buy trip review GUI is displayed to the buyer 103. FIG. 18 is a screenshot view of a current buy trip review GUI 1800 in accordance with at least one embodiment described herein. The current buy trip review GUI 1800 includes a listing 1802 of all products 118 that are being reviewed by the buyer 103 in the current buyer trip.

Figure 19:
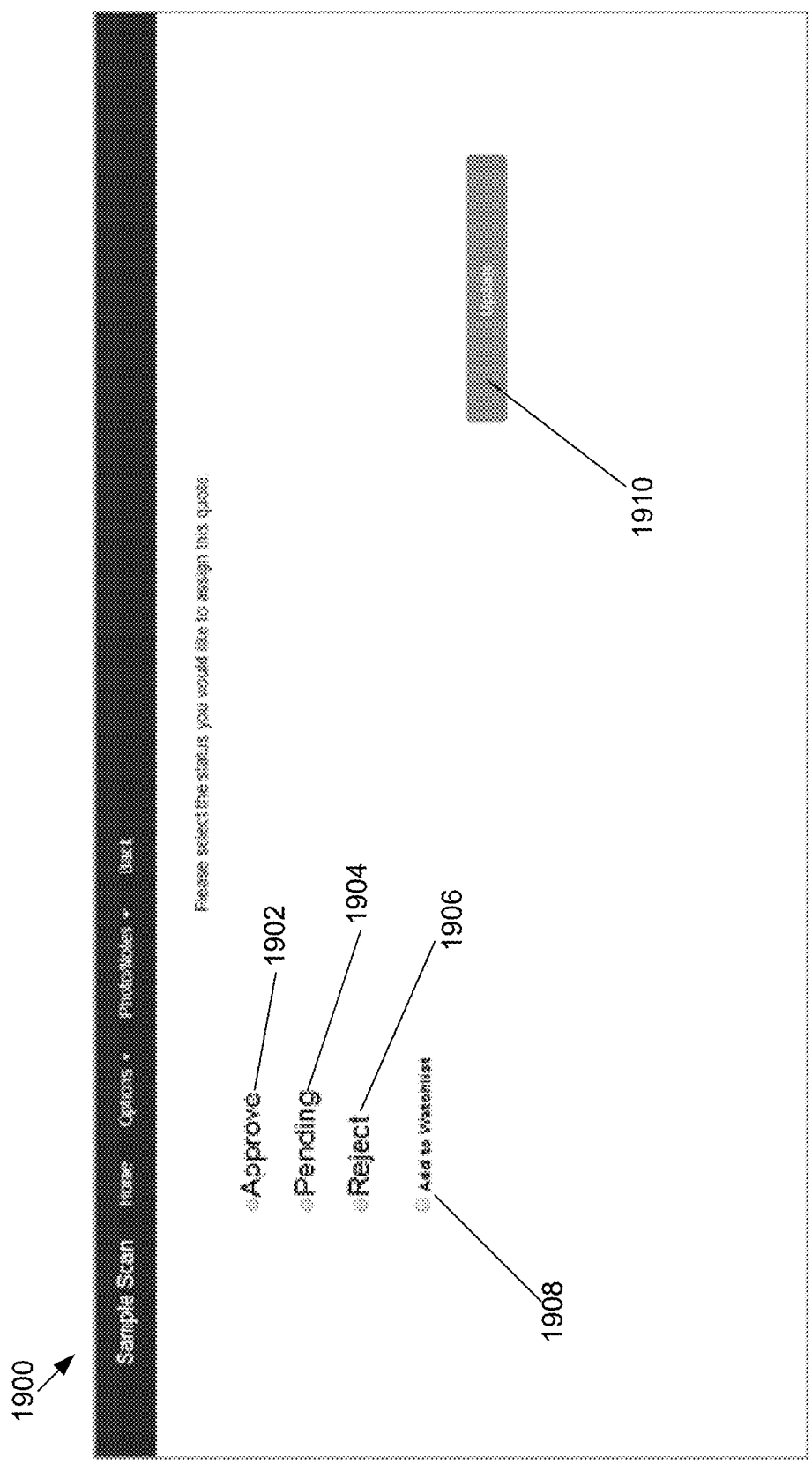
FIG. 19 is a screenshot view of a buy decision GUI in accordance with at least one embodiment described herein.

At block 218, after the buyer 103 has reviewed a selected product 118, and any desired information related to the product and/or the product offer (as discussed above), the buyer 103 may operate the supply chain management tool to indicate a decision on whether to accept or reject the corresponding product offer made by the supplier 111. This is often dependent on whether the supply chain management server has authorized or rejected the offer, whether further levels of authorization are needed, and the like. For example, in one embodiment, while viewing the product information GUI 400, the buyer 103 may select a "Next" button 420. After the "Next" button 420 is pressed, a buy decision GUI is displayed to the buyer 103. FIG. 19 is a screenshot view of a buy decision GUI 1900 in accordance with at least one embodiment described herein. Utilizing the interface 108, the buyer 103 may select a desired status to be associated with the product offer of the currently being reviewed product 118. In one embodiment, the buyer 103 may select an "Approve" button 1902 to approve of the product offer, a "Pending" button 1904 to maintain the product offer as pending, or a "Reject" button 1906 to reject the product offer. In other embodiments, the buyer 103 may select from any other type of product offer status (e.g., a "Selected" status, a "Received" status, a "Committed" status, etc.). The buyer 102 may also select an "Add to Watchlist" button 1908 to add the current product offer to a watch list.

At block 220, after the buyer 102 has chosen the desired product offer status 1902-1906, the buyer 103 may select an "Update" button 1910. After the "Update" button 1910 is selected, the buy decision indicated by the buyer 103 is transmitted to the supply chain management server 112 and stored in the offer database 113a in relation to the corresponding product offer.

Figure 20:
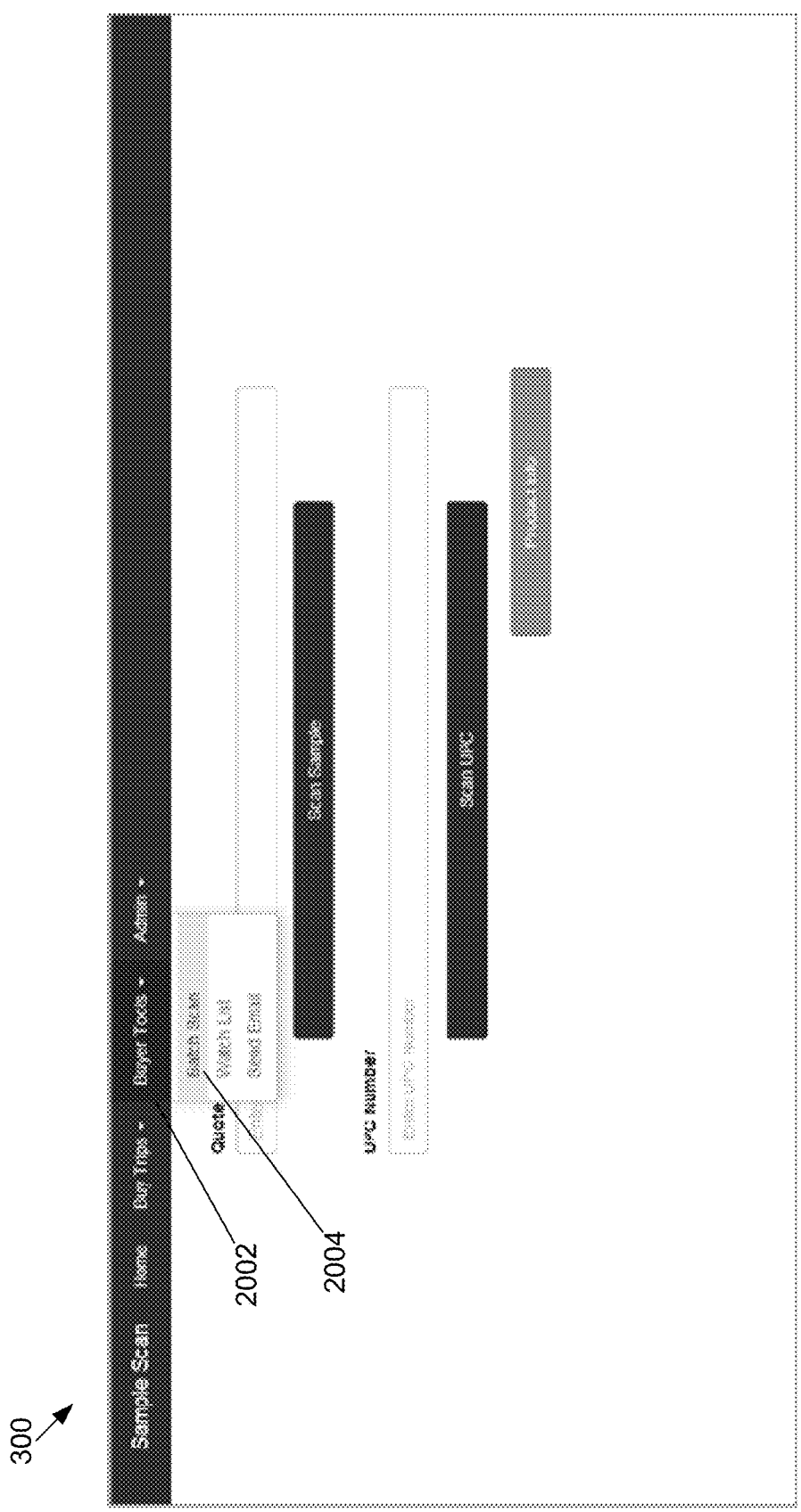
FIG. 20 is another screenshot view of a product ID code retrieval GUI in accordance with at least one embodiment described herein.

As described above at block 218, the buyer 103 may make buy decisions (i.e., product offer decisions) regarding a single product; however, in other embodiments, the buyer 103 may make buy decisions regarding a group of products simultaneously. For example, as seen in FIG. 20, at block 204, while viewing the product ID code retrieval GUI 300, the buyer 103 may select a "Buyer Tools" tab 2002. After selecting the "Buyer Tools" tab 2002, the buyer 103 may select a "Batch Scan" button 2004. After selecting the "Batch Scan" button 2004, at block 222, a batch scan GUI is displayed to the buyer 103.

Figure 21:
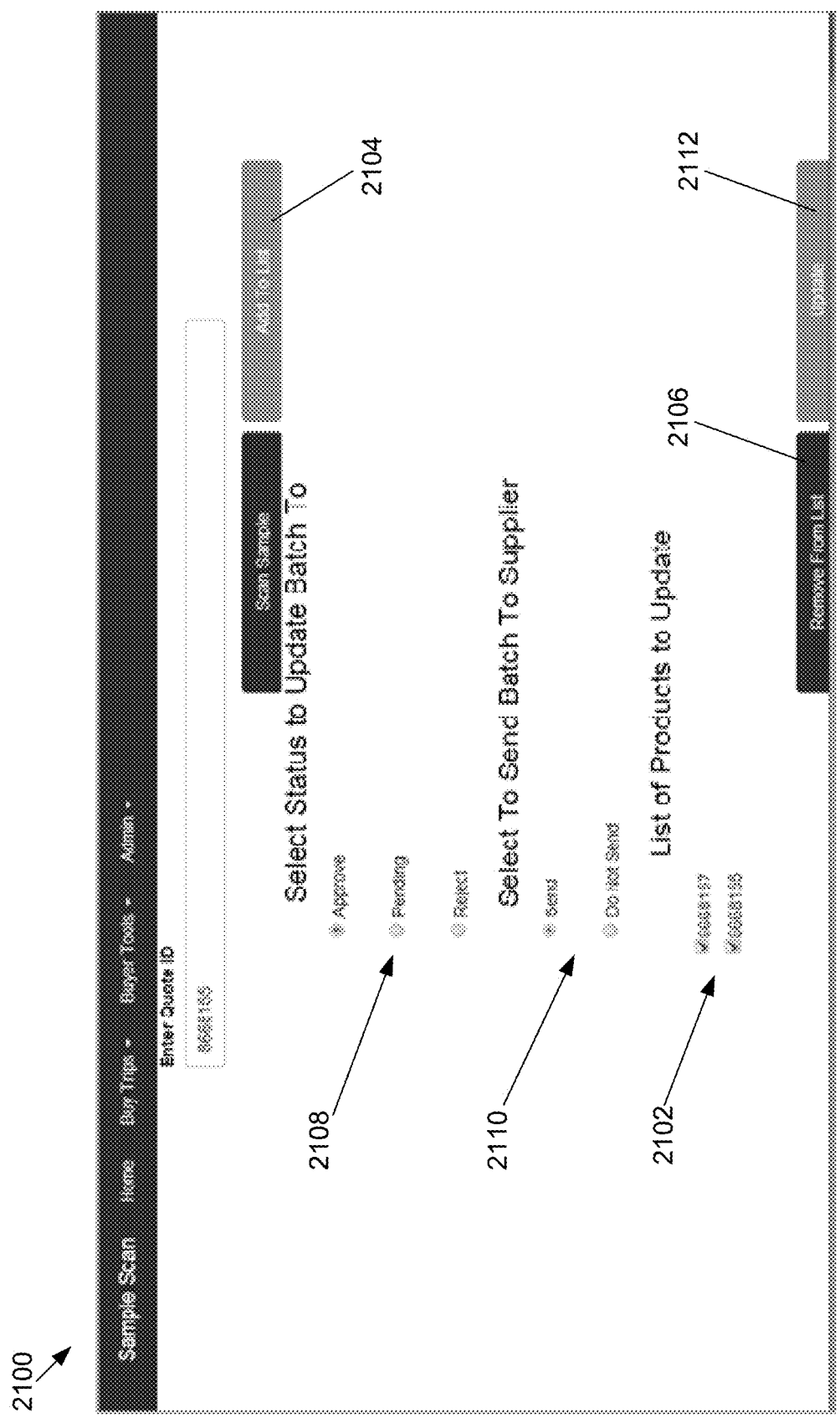
FIG. 21 is a screenshot view of a batch scan GUI in accordance with at least one embodiment described herein.

FIG. 21 is a screenshot view of a batch scan GUI 2100 in accordance with at least one embodiment described herein. The buyer 103 operates the batch scan GUI 2100 to generate a batch scan list 2102. Similarly as discussed above with regard to the product ID code retrieval GUI 300, ID code information may be manually entered by the buyer 103, via the interface 108, into the batch scan GUI 2100 or it may be scanned into the batch scan GUI 2100 by the ID code reader 110. After an ID code is entered into the batch scan GUI 2100 (either manually or via scanning), the buyer 103 may add the ID code, and corresponding product, to the batch scan list 2102 by selecting an "Add to list" button 2104. A buyer 103 may remove a product from the list 2102 by selecting the product and selecting a "Remove From List" button 2106.

After the desired batch scan list 2102 has been generated, at block 218, the buyer 103 may select a product offer status 2108 to apply to the entire batch scan list 2102 (or a selected portion of the batch scan list 2102). For example, the buyer 103 may choose to approve, reject, or maintain as pending, all product offers associated with the products in the list 2102 (or selected portion of the list 2102. The buyer 103 may also select a send decision 2110 on whether the buyer 103 wishes to send the batch product offer decisions to the supplier 111. At block 220, after the buyer 102 has chosen the desired product offer status 2108 for the batch of products 2102, the buyer 103 may select an "Update" button 2112. After the "Update" button 2112 is selected, the product offer decisions indicated by the buyer 103 for the batch of products 2102 are transmitted to the supply chain management server 112 and stored in the offer database 113a in relation to the corresponding product offers.

Figure 22:
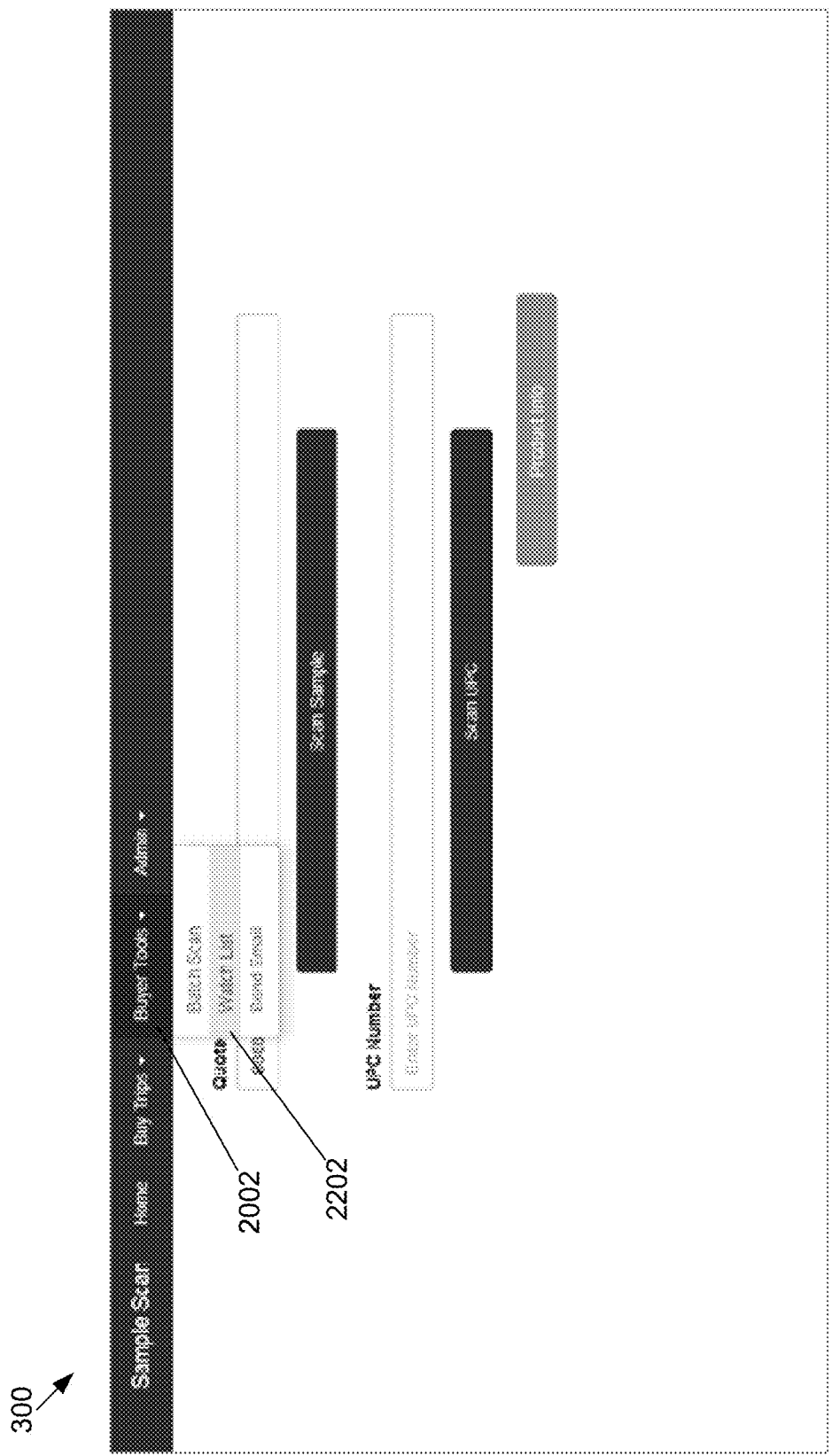
FIG. 22 is another screenshot view of a product ID code retrieval GUI in accordance with at least one embodiment described herein.

As discussed above, at block 204, the buyer 103 may manually enter or scan in ID code information of a product that is currently being reviewed. According to one embodiment, at block 224, the buyer 103 may also select a product which was previously added to a watch list. For example, as seen in FIG. 22, while viewing the product ID code retrieval GUI 300, the buyer 103 may select a "Buyer Tools" tab 2002. After selecting the "Buyer Tools" tab 2002, the buyer 103 may select a "Watch List" button 2202. After selecting the "Watch List" button 2202, at block 224, a watch list GUI is displayed to the buyer 103.

Figure 23:
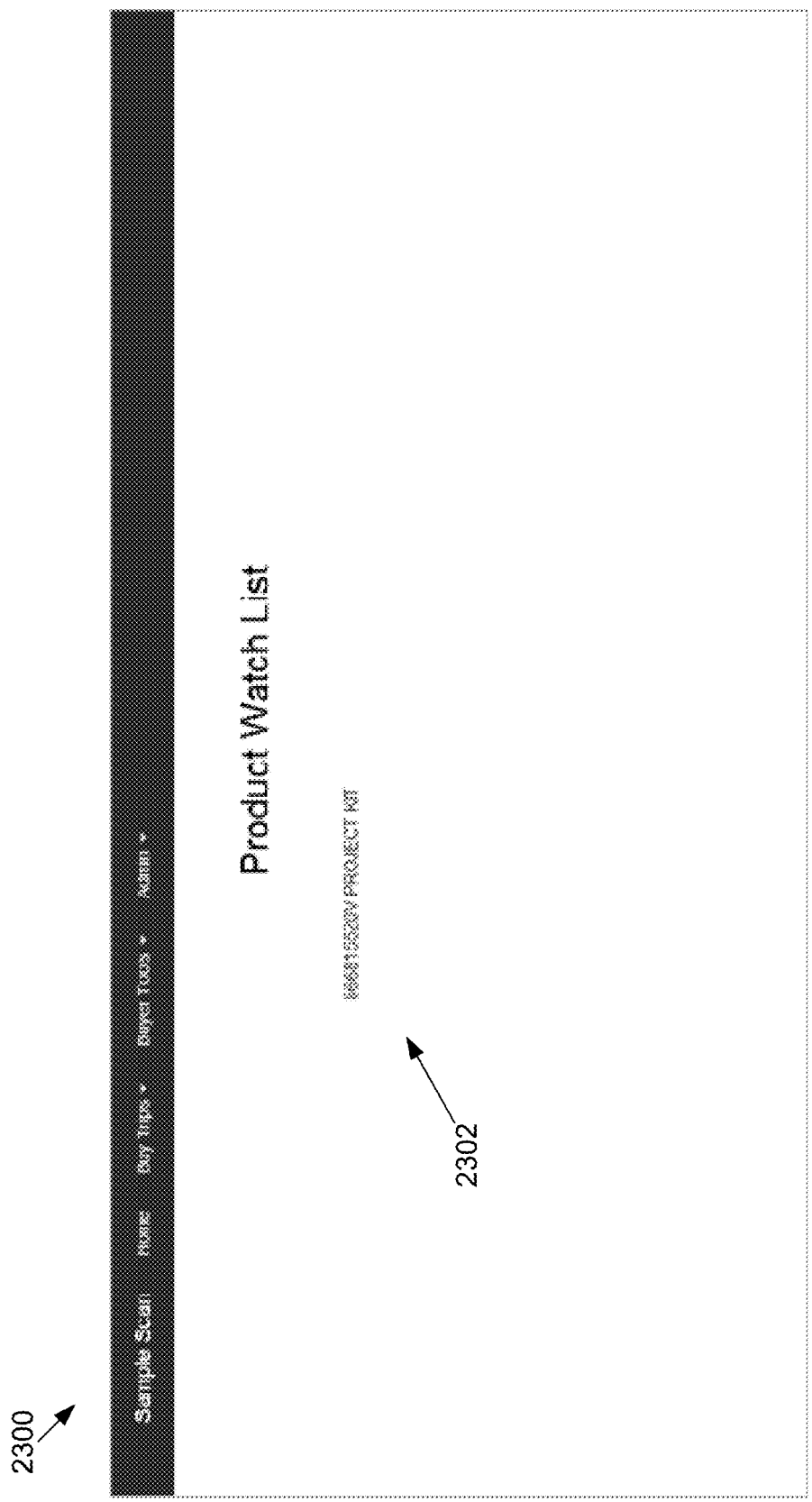
FIG. 23 is a screenshot view of a watch list GUI in accordance with at least one embodiment described herein.

FIG. 23 is a screenshot view of a watch list GUI 2300 in accordance with at least one embodiment described herein. The watch list GUI 2300 includes a watch list 2302 of products that were previously added to the watch list (e.g., by selecting the "Add to Watchlist" button 1908 in the buy decision GUI 1900 as discussed above). The buyer 103 may select a product from the watch list 2302. After selecting a product from the watch list 2302, at block 206 the supply chain management module 104 retrieves and displays product and product offer information related to the selected product as discussed above. Further, the supply chain management server can further apply one or more rules to current parameters relative to the selected product from the watch list to provide an up to date and current automatic evaluation of a product offer based on current parameters and conditions.

Figure 24:
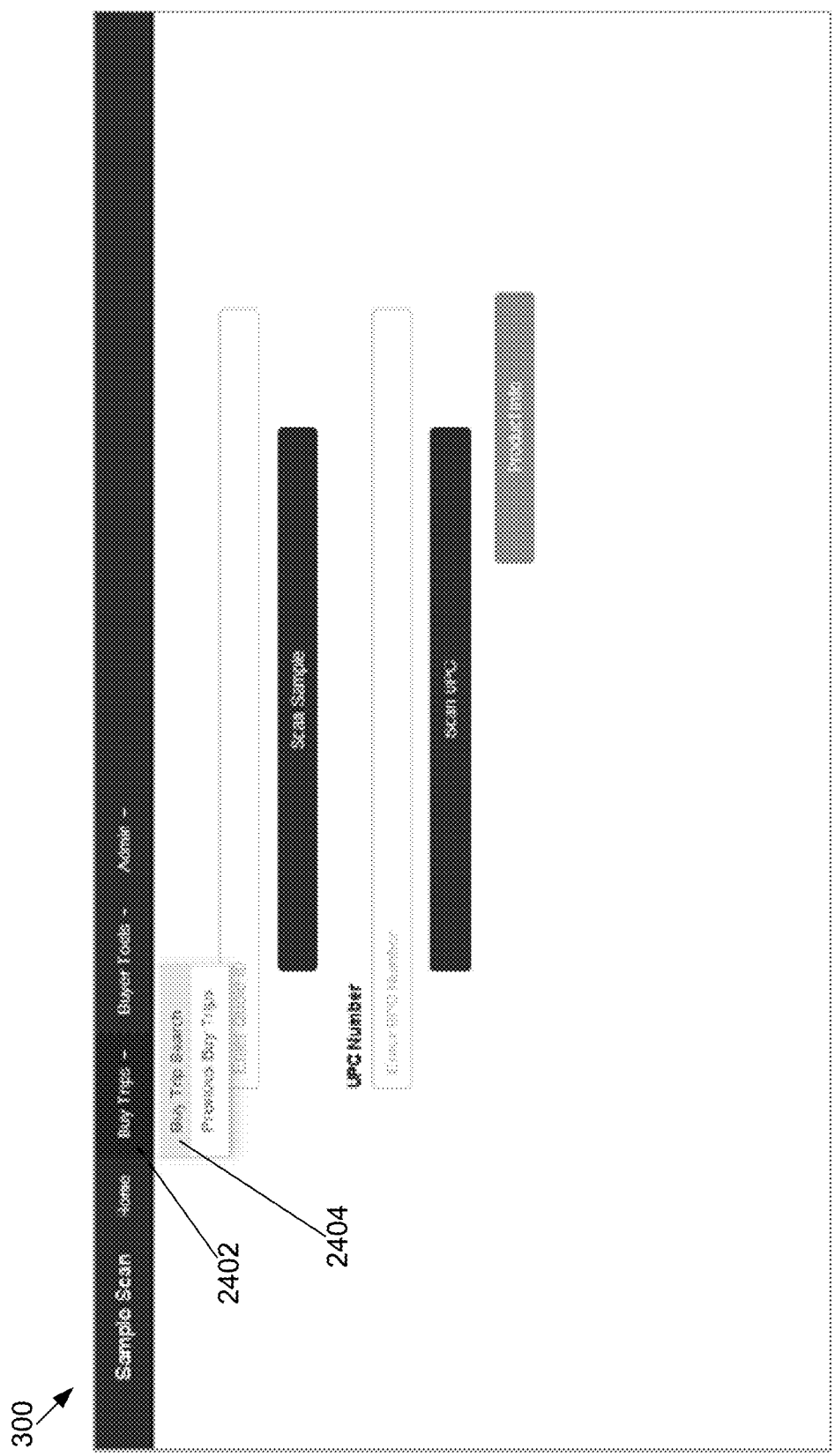
FIG. 24 is another screenshot view of a product ID code retrieval GUI in accordance with at least one embodiment described herein.

According to another embodiment, at block 226, the buyer 103 may also select a product by searching for a corresponding buy trip. For example, as seen in FIG. 24, while viewing the product ID code retrieval GUI 300, the buyer 103 may select a "Buy Trips" tab 2402. After selecting the "Buy Trips" tab 2402, the buyer 103 may select a "Buy Trip Search" button 2404. After selecting the "Buy Trip Search" button 2404, at block 226, a buy trip search GUI is displayed to the buyer 103.

Figure 25:
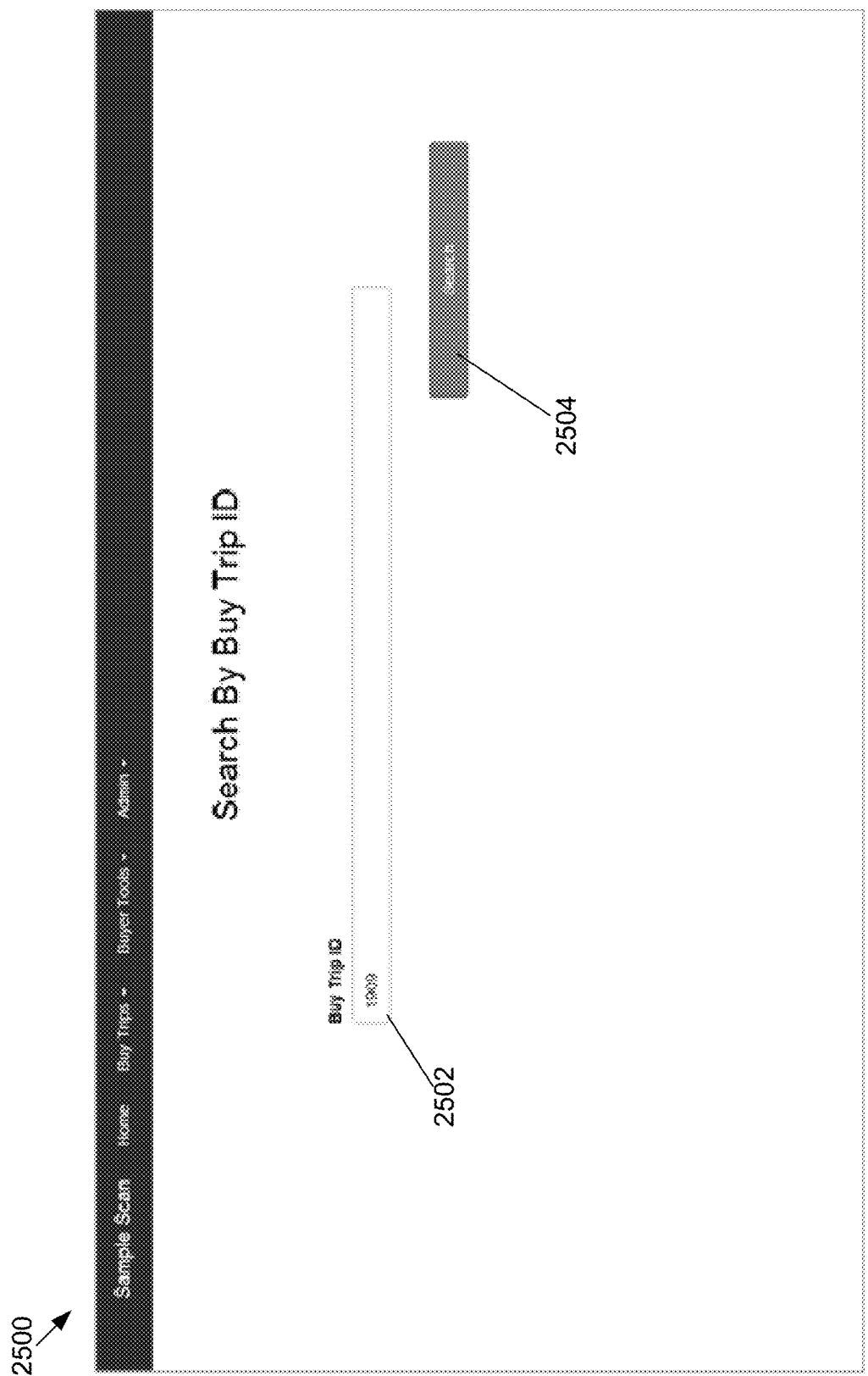
FIG. 25 is a screenshot view of a buy trip search GUI in accordance with at least one embodiment described herein.

FIG. 25 is a screenshot view of a buy trip search GUI 2500 in accordance with at least one embodiment described herein. The buy trip search GUI 2500 includes a "Buy Trip ID" box 2502. The buyer 103 may utilize the interface 108 to enter a buy trip ID number into the "Buy Trip ID" box 2502. After entering the buy trip ID number into the "Buy Trip ID" box 2502, the buyer 103 may initiate a search for the buy trip by selecting a "Search" button 2504. After the "Search" button 2504 is selected, the supply chain management module 104 transmits the buy trip ID number to the supply chain management server 112 via the network 114. The supply chain management server 112 retrieves information related to the buy trip ID (e.g., information related to products being reviewed during a buy drip corresponding to the buy trip ID) from the offer database 113a and transmits the retrieved information back to the supply chain management module 104 via the network.

Figure 26:
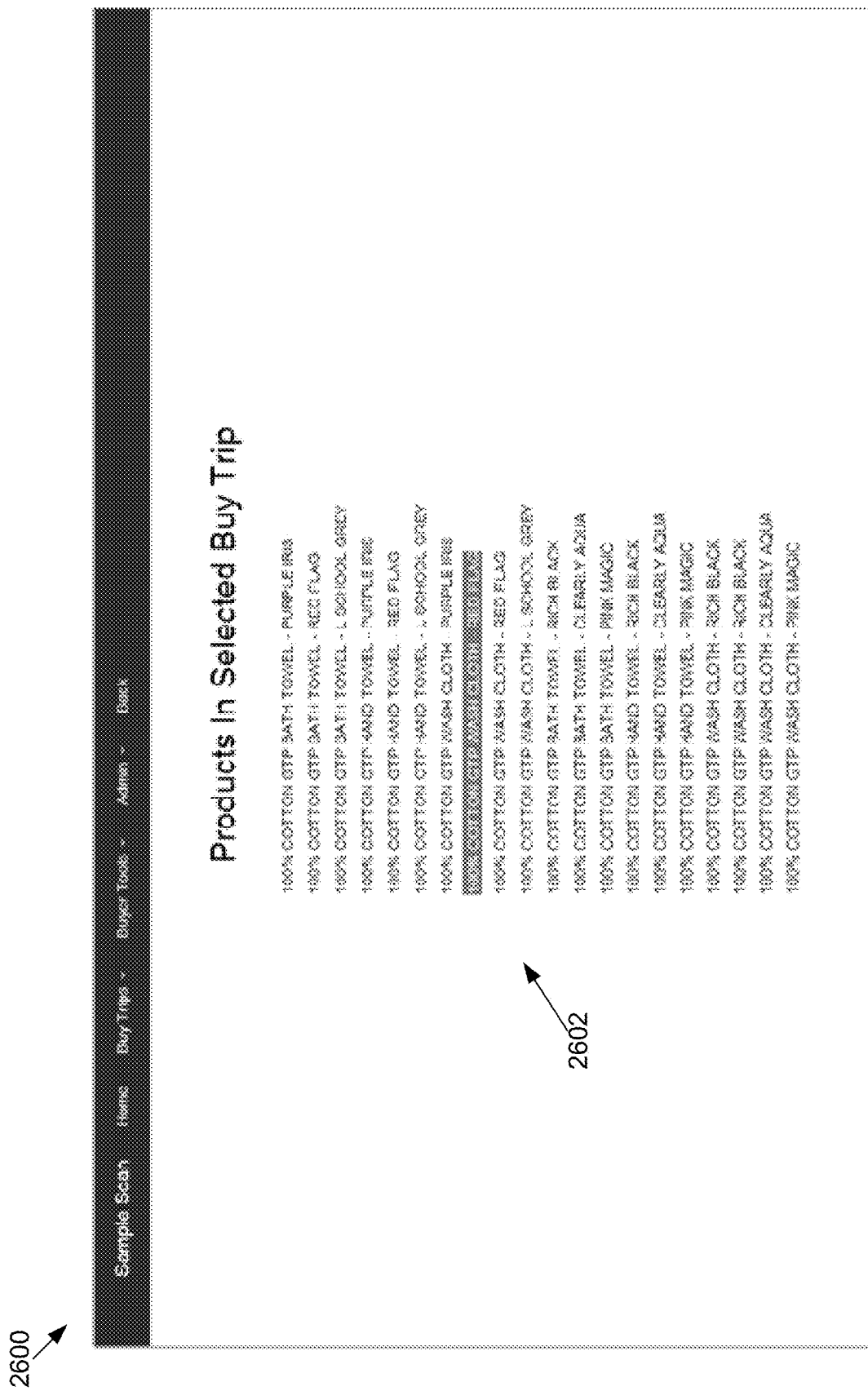
FIG. 26 is a screenshot view of a buy trip search result GUI in accordance with at least one embodiment described herein.

The information related to the buy trip ID, received from the supply chain management server 112, is provided to the buyer 103 via a buy trip search result GUI on the display 106. For example, FIG. 26 is a screenshot view of a buy trip search result GUI 2600 in accordance with at least one embodiment described herein. The buy trip search result GUI 2600 includes a list of products 2602 reviewed during a buy trip corresponding to the entered buy trip ID. The buyer 103 may select a product from the list of products 2602. After selecting a product from the list 2602, at block 206 the supply chain management module 104 retrieves and displays product and product offer information related to the selected product as discussed above.

Various embodiments according to the present invention may be implemented on one or more computer systems or other devices. A computer system may be a single computer that may include a minicomputer, a mainframe, a server, a personal computer, or combination thereof. The computer system may include any type of system capable of performing remote computing operations (e.g., cell phone, PDA, tablet, smart-phone, set-top box, or other system). A computer system used to run the operation may also include any combination of computer system types that cooperate to accomplish system-level tasks. Multiple computer systems may also be used to run the operation. The computer system also may include input or output devices, displays, or data storage units. It should be appreciated that any computer system or systems may be used, and the invention is not limited to any number, type, or configuration of computer systems.

These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate operation of the described system according to various embodiments of the invention. Further, the system may be located on a single computer or may be distributed among a plurality of computers attached by a communications network.

Figure 27:
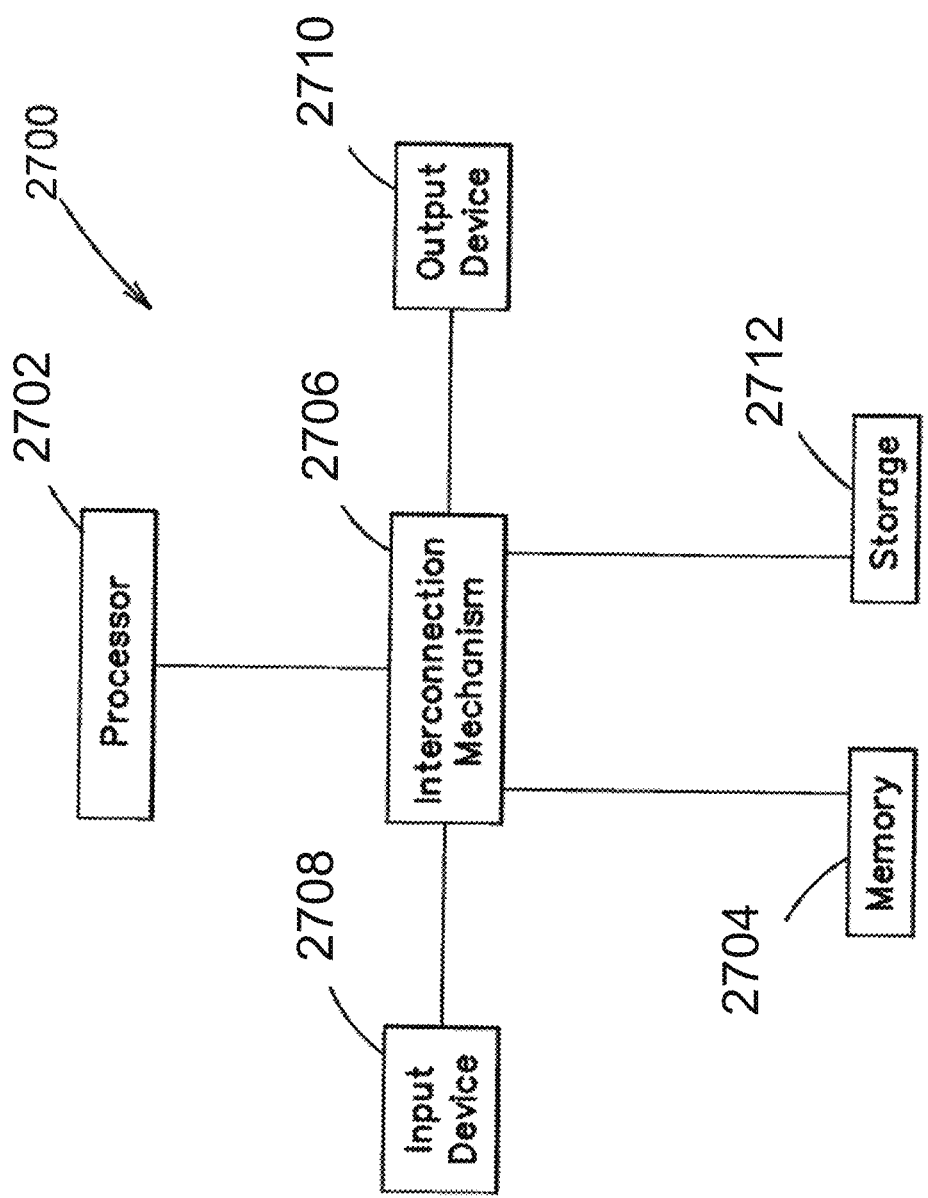
FIG. 27 is a block diagram of a general-purpose computer system upon which various embodiments of the invention may be implemented.

For example, various aspects of the invention may be implemented as specialized software executing in a general-purpose computer system 2700 such as that shown in FIG. 27. The computer system 2700 may include a processor 2702 connected to one or more memory devices (i.e., data storage) 2704, such as a disk drive, memory, or other device for storing data. Memory 2704 is typically used for storing programs and data during operation of the computer system 2700. Components of computer system 2700 may be coupled by an interconnection mechanism 2706, which may include one or more busses (e.g., between components that are integrated within a same machine) and/or a network (e.g., between components that reside on separate discrete machines). The interconnection mechanism 2706 enables communications (e.g., data, instructions) to be exchanged between system components of system 2700. Computer system 2700 also includes one or more input devices 2708, for example, a keyboard, mouse, trackball, microphone, touch screen, and one or more output devices 2710, for example, a printing device, display screen, and/or speaker. In addition, computer system 2700 may contain one or more interfaces that connect computer system 2700 to a communication network (in addition or as an alternative to the interconnection mechanism 2706).

The storage system 2712, shown in greater detail in FIG. 28, typically includes a computer readable and writeable nonvolatile recording medium 2802 in which signals are stored that define a program to be executed by the processor or information stored on or in the medium 2802 to be processed by the program. The medium may, for example, be a disk or flash memory. Typically, in operation, the processor causes data to be read from the nonvolatile recording medium 2802 into another memory 2804 that allows for faster access to the information by the processor than does the medium 2802. This memory 2804 is typically a volatile, random access memory such as a dynamic random access memory (DRAM) or static memory (SRAM). It may be located in storage system 2712, as shown, or in memory system 2704. The processor 2702 generally manipulates the data within the integrated circuit memory 2704, 2804 and then copies the data to the medium 2802 after processing is completed. A variety of mechanisms are known for managing data movement between the medium 2802 and the integrated circuit memory element 2704, 2804, and the invention is not limited thereto. The invention is not limited to a particular memory system 2704 or storage system 2712.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 2700 is shown by way of example as one type of computer system upon which various aspects of the invention may be practiced, it should be appreciated that aspects of the invention are not limited to being implemented on the computer system as shown in FIG. 27. Various aspects of the invention may be practiced on one or more computers having a different architecture or components that that shown in FIG. 27.

Computer system 2700 may be a general-purpose computer system that is programmable using a high-level computer programming language. Computer system 2700 may be also implemented using specially programmed, special purpose hardware. In computer system 2700, processor 2702 is typically a commercially available processor such as the well-known Pentium class processor available from the Intel Corporation. Many other processors are available. Such a processor usually executes an operating system which may be, for example, the Windows 7 or Windows 8 operating systems available from the Microsoft Corporation, MAC OS System X operating system or an iOS operating system available from Apple Computer, one of many Linux-based operating system distributions, for example, the Enterprise Linus operating system available from Red Hat Inc., or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

As described above, the supply chain management tool provided to the buyer 103 is capable of providing a variety of different GUIs to the buyer 103. The different GUIs may be provided to the buyer 103 in any order to assist the buyer 103 in reviewing a product 118. Also, the supply chain management tool may be configured to provide any number and/or type of GUI to the buyer 103 to assist in reviewing a product 118.

As described herein, a more efficient and cost effective system and method for supply chain management is provided. The improved system and method for supply chain management enables buyers, via a mobile device, to more easily and rapidly make purchasing decisions on products and share/receive information related to products. It virtualizes a current sample tag, provides a data store for notes and photos that can be shared with other associates in real-time, and allows for purchase decisions to be shared, via the system, in real time.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A supply chain management system comprising:
   a mobile device comprising a scanner configured to record an identification code associated with a sample product under consideration for purchase from a separate supplier to be supplied to one or more retailers to be subsequently offered for sale by the one or more retails to customers;
   a supply chain management module of the mobile device coupled to the scanner;

a supply chain management server communicatively coupled with the supply chain management module of the mobile device via distributed communications network; and a network interface of the mobile device coupled to the supply chain management module;

wherein the supply chain management module is configured to:

retrieve the identification code from the scanner;

transmit the identification code to a supply chain management server via the network interface;

receive product offer information of a product offer, for the purchase by the one or more retailers of quantities of the product from the supplier, related to the sample product from the supply chain management server via the network interface, wherein the product offer information comprises a price per unit item of the product, number of units of the product available, supplier information of the supplier, and manufacture information for the manufacturer of the units of the product;

cause a supply chain management graphical user interface (GUI) to be presented through a user interface of the mobile device and receive, through the supply chain management GUI, user generated information related to the sample product;

transmit a product offer status update related to the sample product, based on the user generated information related to the sample product, to the supply chain management server via the network interface; and the supply chain management server configured to access one or more sets of rules and apply the one or more sets of rules to determine whether the product offer should be authorized, wherein the supply chain management server in applying the one or more sets of rules is configured to:

access at least a first set of rules, of the one or more sets of rules, that are applied to evaluate parameters related to the product offer; and apply the first set of rules to evaluate offer related parameters of the product offer relative to one or more corresponding thresholds, and determine based on the first set of rules whether the product offer is to be authorized when the offer related parameters are within the corresponding thresholds, comprising access one or more factory rules, of the one or more sets of rules, and apply the one or more factory rules to evaluate factory parameters specific to the product offer, wherein the factory parameters comprise factory audit data and the applying the factory rules includes applying the one or more factory rules to evaluate the factory audit data relative to a factory condition threshold; and generate an automated authorization to purchase in response to confirming the product offer is authorized.

2. The system of claim 1, wherein the supply chain management server is further configured to cause a notification to be communicated in real time to the supply chain management module based on the applied first set of rules and the determination of whether the product offer should be authorized, wherein the notification is consistent with the determination of whether the product offer is automatically authorized.

3. The system of claim 1, wherein the supply chain management server is further configured to apply a second set of rules to identify when supervisory authorization is needed, and cause a notification of a need for the supervisory authorization to be communicated to the supply chain management module, and a remote supervisory system associated with a supervisory authority associated with a buyer operating the scanner.

4. The system of claim 1, further comprising a display communicatively coupled with the supply chain management module, wherein the supply chain management module is further configured to provide the received product offer information to the display, and to receive product information related to the sample product from the supply chain management server and to provide the received product information to the display.

5. The system of claim 1, further comprising a display communicatively coupled with the supply chain management module, wherein the supply chain management module is further configured to provide a supply chain management tool to the display, and to generate the product offer status update based on user interaction with the supply chain management tool.

6. The system of claim 5, wherein the supply chain management module is further configured to transmit buyer-generated information to the supply chain management server via the network interface, the buyer-generated information based on user interaction with the supply chain management tool, and to transmit the buyer-generated information to a member of a buyer support team via the network interface.

7. The system of claim 1, wherein the user generated information related to the sample product comprising user-generated notes related to the sample product.

8. The system of claim 1, wherein the supply chain management server, in determining whether the product offer should be authorized, is further configured to apply a set of one or more product quality rules in automatically evaluating at least one of product offer information in relation to the quality thresholds to determine whether a scanned product complies with the quality rules and automatically overriding the authorization to purchase when not in compliance with the quality threshold.

9. A method of managing a supply chain, the method comprising:

retrieving, with a scanner of a mobile device, an identification code associated with a sample product under consideration for purchase from a separate supplier to be supplied to one or more retailers to be subsequently offered for sale by the one or more retails to customers;

transmitting, with a supply chain management module of the mobile device, the identification code to a supply chain management server via a network interface of the mobile device;

receiving, with the supply chain management module via the network interface, product offer information of a product offer, for the purchase by the one or more retailers of quantities of the product from the supplier, related to the sample product from the supply chain management server, wherein the product offer information comprises a price per unit item of the product, number of units of the product available, supplier information of the supplier, and manufacture information for the manufacturer of the units of the product;

causing a supply chain management graphical user interface (GUI) to be presented through a user interface of the mobile device and receiving, through the supply chain management GUI, user generated information related to the sample product;

transmitting a product offer status update related to the sample product, based on the user generated information related to the sample product, to the supply chain management server via the network interface; and accessing, by the remote supply chain management server, one or more sets of rules and applying the one or more sets of rules to determine whether the product offer should be authorized;

accessing at least a first set of rules, of the one or more sets of rules, that are applied to evaluate parameters related to the product offer;

applying the first set of rules to evaluate offer related parameters relative to one or more corresponding thresholds;

determining based on the first set of rules whether the product offer is to be authorized when the offer related parameters are within the corresponding thresholds, comprising:

accessing one or more factory rules, of the one or more sets of rules, and applying the one or more factory rules to evaluate factory parameters specific to the product offer, wherein the factor parameters comprise factory audit data and the applying the factory rules comprises applying the one or more factory rules to evaluate the factory audit data relative to a factory condition threshold; and generating an automated authorization to purchase in response to confirming the product offer is authorized.

10. The method of claim 9, further comprising:
by the supply chain management server:
causing a notification to be communicated in real time to the supply chain management module based on the applied first set of rules and the determination of whether the product offer should be authorized, wherein the notification is consistent with the determination of whether the product offer is automatically authorized.

11. The system of claim 9, applying a second set of rules comprises:
identifying when supervisory authorization is needed; and
causing a notification of a need for the supervisory authorization to be communicated to the supply chain management module and a remote supervisory system associated with a supervisory authority associated with a buyer operating the scanner.

12. The method of claim 9, further comprising displaying at least one of the product offer information and the product information to a buyer via a display of the mobile device.

13. The method of claim 9, further comprising:
providing, with the supply chain management module, a supply chain management tool to a display; and
generating the product offer status update based on a buyer's interaction with the supply chain management tool.

14. The method of claim 13, further comprising:
receiving, via the buyer's interaction with the supply chain management tool, buyer-generated information related to the sample product;
transmitting the buyer-generated information to the supply chain management server via the network interface; and
transmitting the buyer-generated information to at least one member of a buyer support team via the network interface in real time.

15. The method of claim 14, further comprising:
updating, with the supply chain management server based on the product offer status update, a product offer stored in an offer database related to the sample product.

16. A non-transitory computer-readable medium encoded with instructions for execution on a distributed computer system within a supply chain, the instructions when executed, performing a method comprising acts of:

retrieving, with a scanner of a mobile device, an identification code associated with a sample product under consideration for purchase from a separate supplier to be supplied to one or more retailers to be subsequently offered for sale by the one or more retails to customers;

transmitting, with a supply chain management module of the mobile device, the identification code to a supply chain management server via a network interface of the mobile device;

receiving, with the supply chain management module, product offer information of a product offer, for the purchase by the one or more retailers of quantities of the product from the supplier, related to the sample product from the supply chain management server via the network interface, wherein the product offer information comprises a price per unit item of the product, number of units of the product available, supplier information of the supplier, and manufacture information for the manufacturer of the units of the product;

causing a supply chain management graphical user interface (GUI) to be presented through a user interface of the mobile device and receiving, through the supply chain management GUI, user generated information related to the sample product; and transmitting a product offer status update related to the sample product, based on the user generated information related to the sample product, to the supply chain management server via the network interface;

accessing one or more sets of rules and applying the one or more sets of rules to determine whether the product offer should be authorized;

accessing at least a first set of rules, of the one or more sets of rules, that are applied to evaluate parameters related to the product offer;

applying the first set of rules to evaluate offer related parameters relative to one or more corresponding thresholds;

determining based on the first set of rules whether the product offer is to be authorized when the offer related parameters are within the corresponding thresholds, comprising:

accessing one or more factory rules, of the one or more sets of rules, and applying the one or more factory rules to evaluate factory parameters specific to the product offer, wherein the factor parameters comprise factory audit data and the applying the factory rules comprises applying the one or more factory rules to evaluate the factory audit data relative to a factory condition threshold; and generating an automated authorization to purchase in response to confirming the product offer is authorized.

17. The system of claim 1, wherein the supply chain management server, in applying the one or more sets of rules, is configured to apply the one or more sets of rules to information unavailable to the user at the time of scanning the identification code, comprising evaluating a history of the manufacturer relative to compliance with one or more retailer standards in automating a determination that the product offer should be rejected; and receive, through the supply chain management module of the mobile device and from the supply chain management server, a notification of the automated rejection by the supply chain management server of the offer.

18. The system of claim 17, receive, over the distributed communications network through the supply chain management module of the mobile device, input from each of one or more other buyer team members accessing in real-time, through the supply chain management server, the user generated information related to the sample product and additional data regarding the offer providing the user with a cooperative buying experience.

* * * * *

UNITED STATES PATENT AND TRADEMARK OFFICE
CERTIFICATE OF CORRECTION

PATENT NO. : 10,713,620 B2
APPLICATION NO. : 15/418346
DATED : July 14, 2020
INVENTOR(S) : Jacob Tucker et al.

Page 1 of 1

It is certified that error appears in the above-identified patent and that said Letters Patent is hereby corrected as shown below:

On the Title Page

Applicant item (71), delete "LLC." and insert --LLC--.

In the Claims

In Claim 1, Column 21, Line 45, delete "access one" and insert --access to one--.
In Claim 9, Column 23, Line 21, delete "factor" and insert --factory--.
In Claim 11, Column 23, Line 37, delete "system" and insert --method--.
In Claim 16, Column 24, Line 51, delete "factor" and insert --factory--.

Signed and Sealed this
First Day of December, 2020

Andrei Iancu
*Director of the United States Patent and Trademark Office*